(12) United States Patent
Bar-Tal et al.

(10) Patent No.: US 10,807,624 B2
(45) Date of Patent: Oct. 20, 2020

(54) TRAIN COLLISION AVOIDANCE AND ALERT

(71) Applicant: EYEDOG ISRAEL LTD., Ashdod (IL)

(72) Inventors: Mordehai Bar-Tal, Ashdod (IL); Reuven Nanikashvili, Ashdod (IL)

(73) Assignee: EYEDOG ISRAEL LTD., Ashdod (IL)

( * ) Notice: Subject to any disclaimer, the term of this patent is extended or adjusted under 35 U.S.C. 154(b) by 218 days.

(21) Appl. No.: 15/894,092

(22) Filed: Feb. 12, 2018

(65) Prior Publication Data
US 2019/0248392 A1  Aug. 15, 2019

(51) Int. Cl.
| | | |
|---|---|---|
| G05D 1/00 | (2006.01) |
| G05D 3/00 | (2006.01) |
| G06F 7/00 | (2006.01) |
| G06F 17/00 | (2019.01) |
| B61L 23/34 | (2006.01) |
| B61L 15/00 | (2006.01) |
| B61L 3/00 | (2006.01) |
| B61L 15/02 | (2006.01) |
| B61L 9/04 | (2006.01) |
| G01P 3/36 | (2006.01) |
| B61L 29/32 | (2006.01) |
| G01C 22/00 | (2006.01) |
| G06T 7/20 | (2017.01) |
| G06K 9/00 | (2006.01) |

(52) U.S. Cl.
CPC ............... *B61L 23/34* (2013.01); *B61L 3/008* (2013.01); *B61L 9/04* (2013.01); *B61L 15/009* (2013.01); *B61L 15/02* (2013.01); *B61L 29/32* (2013.01); *G01P 3/36* (2013.01); *G06K 9/00805* (2013.01); *G06T 7/20* (2013.01); *G06T 2207/30241* (2013.01); *G06T 2207/30261* (2013.01)

(58) Field of Classification Search
CPC .. B61L 23/34; B61L 3/008; B61L 9/04; B61L 15/009; B61L 15/02; B61L 29/32; G01P 3/36
USPC ...................................................... 701/20, 28
See application file for complete search history.

(56) References Cited

U.S. PATENT DOCUMENTS

| | | | |
|---|---|---|---|
| 3,365,572 A * | 1/1968 | Strauss | G01S 17/936 246/167 D |
| 6,290,188 B1 | 9/2001 | Bassett | |
| 2004/0056182 A1* | 3/2004 | Jamieson | B61L 23/041 250/221 |
| 2006/0028919 A1* | 2/2006 | Mitschele | G04F 1/005 368/90 |
| 2016/0070125 A1* | 3/2016 | Reich | G02F 1/132 348/164 |
| 2017/0066458 A1* | 3/2017 | Huchrowski | B61L 15/0081 |

(Continued)

*Primary Examiner* — Mahmoud S Ismail

(57) ABSTRACT

Systems and methods are provided for generating a safety notification to a first train with respect to a speed of a second train along a track, the system including a camera transceiver, comprising a light emitter configured to emit a narrow bandwidth light, an image sensor, one or more light reflectors and a lens subsystem; and a processor configured to perform the steps of: determining a train speed and a train position; receiving images from the camera transceiver; processing the images to calculate a speed and a position of a potential obstacle on the track; responsively to calculating the potential obstacle speed and position, determining a safe speed of the train and providing a control signal to control the first train.

20 Claims, 17 Drawing Sheets

(56) References Cited

U.S. PATENT DOCUMENTS

2019/0114914 A1* 4/2019 Gao .................. B61L 21/10
2019/0146520 A1* 5/2019 Naithani ............... B64C 39/024
                                                                                              701/28

* cited by examiner

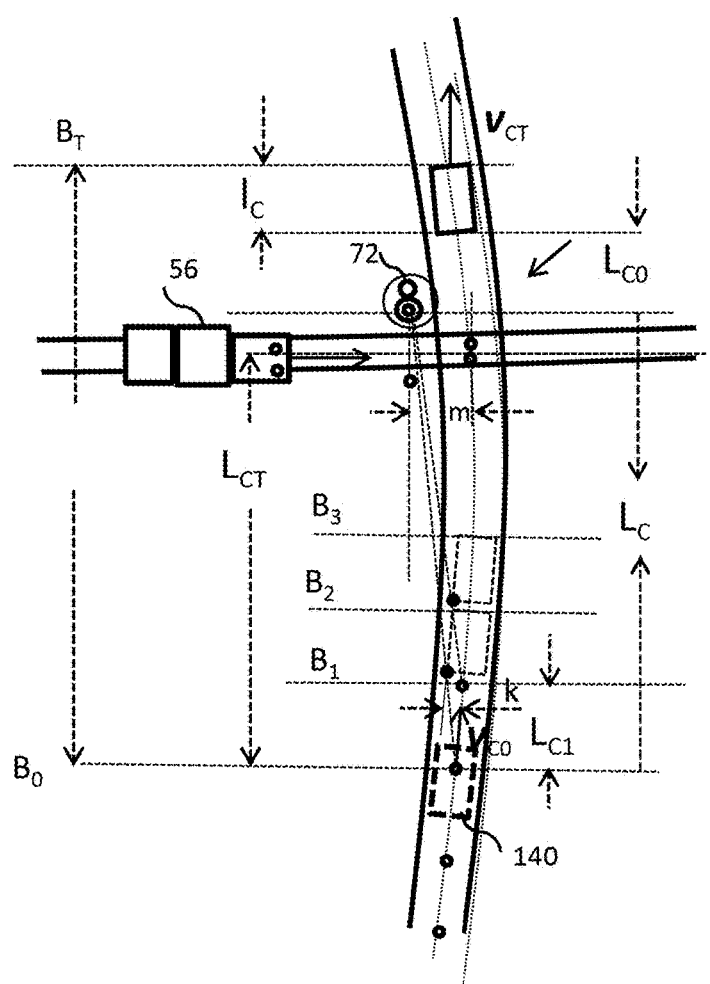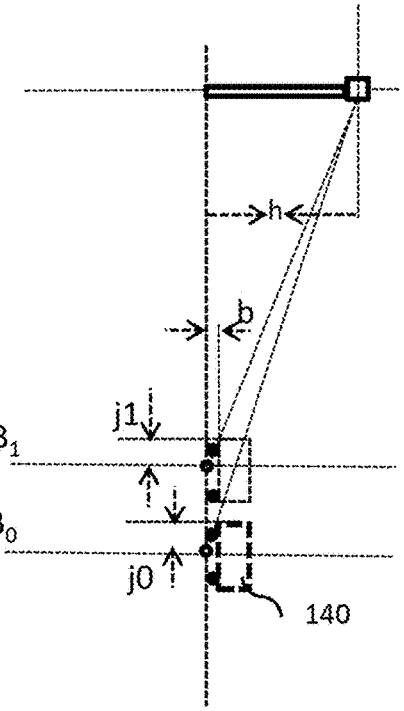
FIG. 10D
FIG. 10E

TRAIN COLLISION AVOIDANCE AND ALERT

FIELD OF THE INVENTION

The present invention is directed to systems and methods for train operation and safety, and in particular methods for train signaling.

BACKGROUND

Loss of life and property in the event of a train collision can be enormous. An ever-present danger is the possibility of a collision between trains if there is a track switching malfunction or error. Consequently, multiple, redundant safety mechanisms are imperative.

Light beam signaling between trains is described in U.S. Pat. No. 3,365,572 to Henry, "Automatic collision prevention, alarm and control system" and in U.S. Pat. No. 6,290,188 to Bassett, "Collision avoidance system for track-guided vehicles". Henry describes a system in which light emitted by trains is turned on and off by a preset duty cycle in order to differentiate that light from ambient light, thereby assisting in visual recognition of trains that might be on a collision course. Bassett describes a system whereby polarized light emitted by light sources on one train are reflected diffusely by on-coming trains, but reflected in a polarized manner from other objects.

SUMMARY

Embodiments of the present invention provide systems and methods for increasing the safety and efficiency of trains by facilitating the distant recognition of obstacles, including trains on the same tracks. According to an embodiment of the present invention, a system may include a camera transceiver, including a light emitter configured to emit a narrow bandwidth light, an image sensor, one or more light reflectors and a lens subsystem; and a processor configured to perform the steps of: determining a train speed and a train position; receiving images from the camera transceiver; processing the images to calculate a speed and a position of a potential obstacle on the track; responsively to calculating the potential obstacle speed and position, determining a safe speed of the train; and responsively to determining the safe speed, providing a control signal to control the first train. The control signal may control an automatic brake unit, an acceleration unit or an audio or visual driver alert unit of the train, or a turning, switching or other control unit of the railway system. Determining the safe speed may include determining a rate of deceleration or acceleration.

In some embodiments, the safe speed may be to stop. The train may be a first train, the potential obstacle may be a second train traveling towards the first train on the track, processing the images may include determining the length of the second train and determining the safe speed may include determining that the train must stop before reaching a junction between the trains. Alternatively, the train may be a first train, the potential obstacle may be a second train traveling towards the first train on the track, processing the images may include determining the length of the second train and determining the safe speed may include determining that the train must take a rail switch at a junction located at a point between the trains.

In some embodiments, the notification further includes a safety level, and the system may be further configured to display the safety level on a screen viewable by the driver or by a railway system supervisor. Additionally, the display may be a stand-alone display, a multimedia/GPS navigation display, or a smartphone/PDA display. The safety level may be one of a set of possible levels comprising a first level that the first train speed may be safe and a second notification that the speed may be unsafe. In further embodiments, the train may be a driverless train. The potential obstacle may be a second train and processing the images may include identifying a representation of the second train in the images. The train may be a first train, the potential obstacle may be an on-coming second train on the track and calculating the speed and position of the obstacle may include receiving the images while the relative speed between the first train and second trains may be changing.

Receiving the images further may include determining a contour of the track from the images and responsively orienting the camera transceiver to a view of the track. The laser emitter and the image sensor may respectively transmit and receive laser pulses through one or more common lenses of the lens subsystem. The train may be a first train, the potential obstacle may be a second train traveling towards the first train on the track, processing the images may include determining the length of the second train by matching a pattern of one or more of a light reflector configuration, a shutter rate, and a color to a pre-defined pattern defining a length. The camera transceiver may be a front camera transceiver and the system further may include back camera transceivers on the second train.

Processing the images may include identifying reflections from the back camera transceivers on a second train and determining the safe speed may include determining a speed to prevent the first train from hitting the back of the second train.

The system may include reflectors installed along the track, processing the images may include identifying an obstruction by identifying a lack of reflected light along a portion of the track, and determining the safe speed may include determining to stop the train due to the lack of reflected light. The system may include a warning tower situated near a railway crossing having reflectors installed on the crossing, processing the images may include identifying from a field of view of the warning tower an obstruction of the reflectors, and determining the safe speed may include determining to stop the train due to the obstruction. The system may include a warning tower situated near a railway crossing, a vehicle approaching the railway crossing may be equipped with a second light emitter and the image sensor may transmit and receive laser pulses.

The system may include a warning tower situated near a railway crossing having reflectors installed on the road, processing the images may include identifying from a field of view of the warning tower an obstruction of the reflectors and responsively determining to stop the vehicle. The system may include a warning tower situated near a railway crossing, processing the images may include identifying from a field of view of the warning tower an obstruction of a registration plate of the vehicle, and determining the vehicle safe speed may include determining to stop the vehicle.

There is further provided, according to embodiments of the present invention, a method for generating a safety notification for a train on a railway track with respect to a vehicle moving on a road crossing the track, the method including: configuring a camera transceiver including a light emitter configured to emit a narrow bandwidth light, an image sensor, light reflectors and a lens subsystem; and providing a processor configured to be communicatively coupled to the camera transceiver and to a memory that may include computer-readable instructions, which cause the processor to perform the steps of: determining a vehicle speed and a vehicle position; receiving images from the camera transceiver; processing the images to calculate a length of a vehicle traveling on the road; responsively to calculating the length of the vehicle, determining a safe speed of the train; and responsively to determining the safe speed, providing a control signal to control the first train.

There is further provided, according to embodiments of the present invention, a method for generating a safety notification with respect to a speed of a first train moving on a track, the method including: configuring a camera transceiver including a light emitter configured to emit a narrow bandwidth light, an image sensor, one or more light reflectors and a lens subsystem; and providing a processor configured to be communicatively coupled to the camera transceiver and to a memory that may include computer-readable instructions, which cause the processor to perform the steps of: determining a first train speed and a first train position; receiving images from the camera transceiver; processing the images to calculate a speed, a position, and a length of a second train traveling on the track; responsively to calculating the second train speed, position, and length of the second train, determining a safe speed of the first train; and providing a control signal to control the first train.

The present invention will be more fully understood from the following detailed description of embodiments thereof.

BRIEF DESCRIPTION OF DRAWINGS

The accompanying drawings illustrate embodiments of the disclosed subject matter and explain principles of embodiments of the disclosed subject matter. Structural details are shown only to the extent necessary for an understanding of the disclosed subject matter and the various ways in which it may be practiced.

FIGS. 10A-10H are schematic, pictorial illustrations of scenarios of operation of the monitoring system, when there is a risk of a potential collision between a train and a vehicle at a railway crossing, according to an embodiment of the present invention.

DETAILED DESCRIPTION OF THE INVENTION

In the following detailed description of various embodiments, reference is made to the accompanying drawings that form a part thereof, and in which are shown by way of illustrating specific embodiments by which the invention may be practiced. It is understood that other embodiments may be envisioned and structural changes made without departing from the scope of the present invention.

Figure 1:
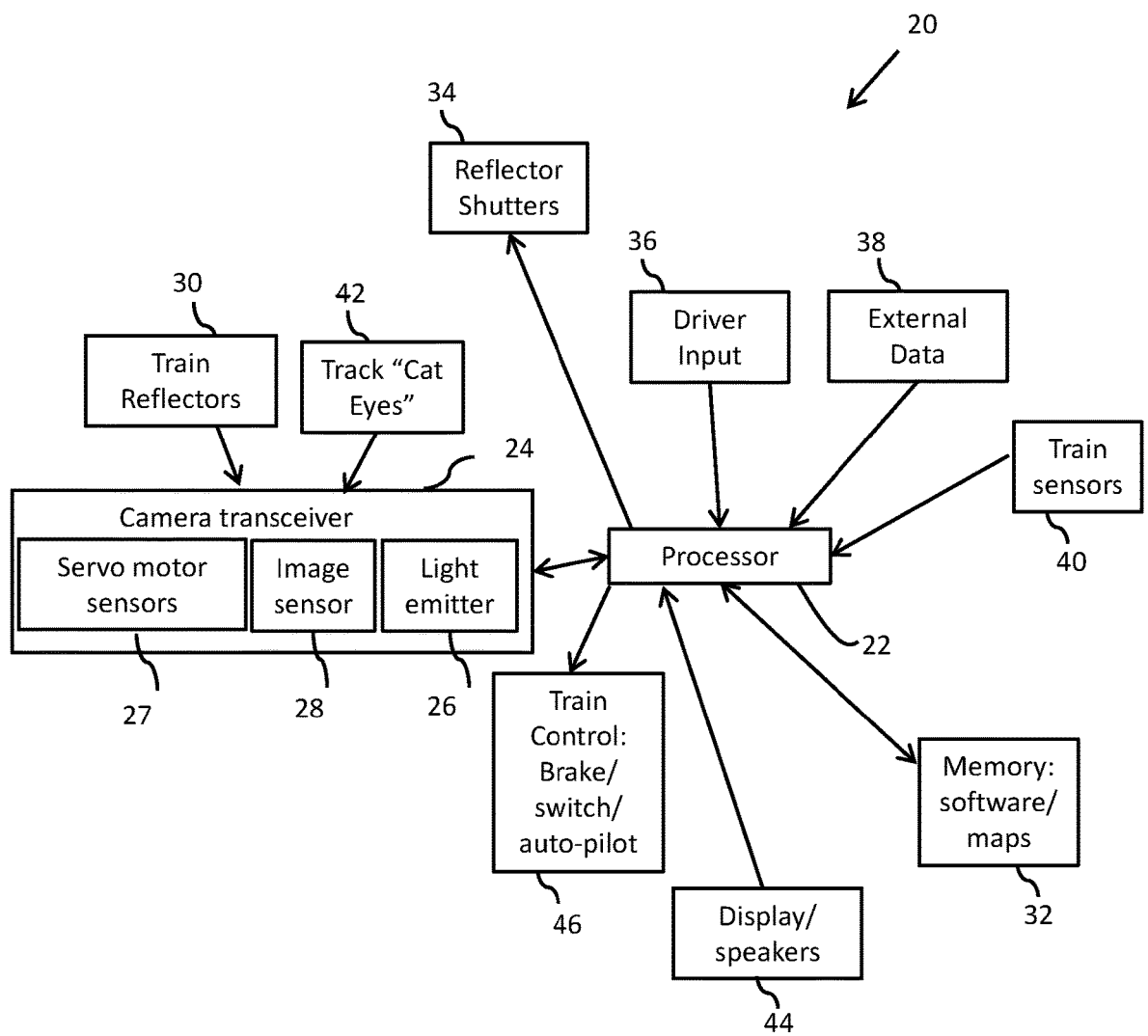
FIG. 1 is a schematic, block diagram of a monitoring system for detecting obstacles on a railway track, according to an embodiment of the present invention.

FIG. 1 is a schematic, block diagram of a monitoring system 20 for monitoring a rail track for obstacles, according to an embodiment of the present invention. The monitoring system is configured to operate on a train in motion and to monitor the track, typically in the forward direction of the train.

The monitoring system includes a processing device, such as a monitoring processor 22, which receives and processes inputs from one or more sources, including a camera transceiver 24. The camera transceiver includes elements described further herein below, such as an image sensor 26, servo motor sensors 27 and a light emitter 28.

The image sensor may be a complementary metal-oxide-semiconductor (CMOS) megapixel chip or similar sensor, typically having a high resolution, such as 40 megapixels. Lenses of the camera described further herein below provide the sensor with a view towards the track in front of the train. The field of view of the camera and other aspect of orientation, zoom, and focus may be controlled by the processor by sending control signals that control the orientation of the camera and/or the lens subsystem.

The light emitter which may be an infrared, conduction-cooled bar package (CCP) laser or similar emitter generally configured to emit a narrow bandwidth light. Light emission from the emitter may be pulsed, or may operate in continuous wave mode (CW) or in quasi-continuous wave mode (Q-CW). The processor controls the light emitter and receives images from the camera sensor. Images may include images with reflections of emitted light and images without such reflections, enabling the processor to process the two types of images and to filter all light other than the reflections.

The monitoring system may include reflectors 30, which are typically installed on the rear or/and front of some or all trains traveling on the same railway system. The system may also include track "cat eye" reflectors 42, which may be installed on the tracks, as described further herein below. Light from the light emitters are reflected from the two types of reflectors and sensed by the image sensor.

Light emitters or reflectors may include shutters 34, which may be controlled by the processor to modulate the frequency of pulses of reflected light. In some embodiments, trains of a given railway system may have multiple reflectors, with or without shutters, installed on both the front and back sides of the trains.

Processor inputs may include a driver input 36, which may be a human driver or an autonomous computer-based mechanism for controlling the operation of the train. Input may also be received from one or more external data sources 38, such as long or/and local area wireless data networks, such as cellular, Wi-Fi, satellite networks, etc., as well as from in-train sensors 40, which provide speed and location data with respect to the train, including GPS data from GPS receivers.

Received data may also include map data stored in a memory 32 of the processor, which is also configured to store the processor software. Based on the map data, the processor may monitor the type of track on which a train is being driven. The map data also includes rail configuration information related to locations of railway junctions and crossings, which enable the processor to perform calculations described herein below when approaching such junctions and crossings.

In additional embodiments, means of driver input, such as a touch screen input, may be provided to indicate the driver's intentions. Based on the speeds and positions of the train and surrounding trains and obstacles, the processor determines whether the current speed is safe. If not, the processor may provide a control signal to control the train, such a safety/warning notification or alert to a display and/or audio output 44.

The display may be a stand-alone display, or an existing train multimedia/GPS navigation display, or a Smartphone/PDA display viewable by the train driver or conductor, and/or a railway system supervisor. The control signal may indicate a safety level such as "safe" or "unsafe", or may be indicated numerically or by color and/or volume. The control signal may be configured to indicate a safe speed, which may include an indication of a need to decelerate or accelerate in order to avoid a potential collision. When a train is approaching a junction, the control signal may be an instruction to turn at the junction. In addition, the control signal may control an automatic control unit 46, such as a brake system or an acceleration system of the train, or a turning, switching or other control unit of the railway system.

Figure 2A:
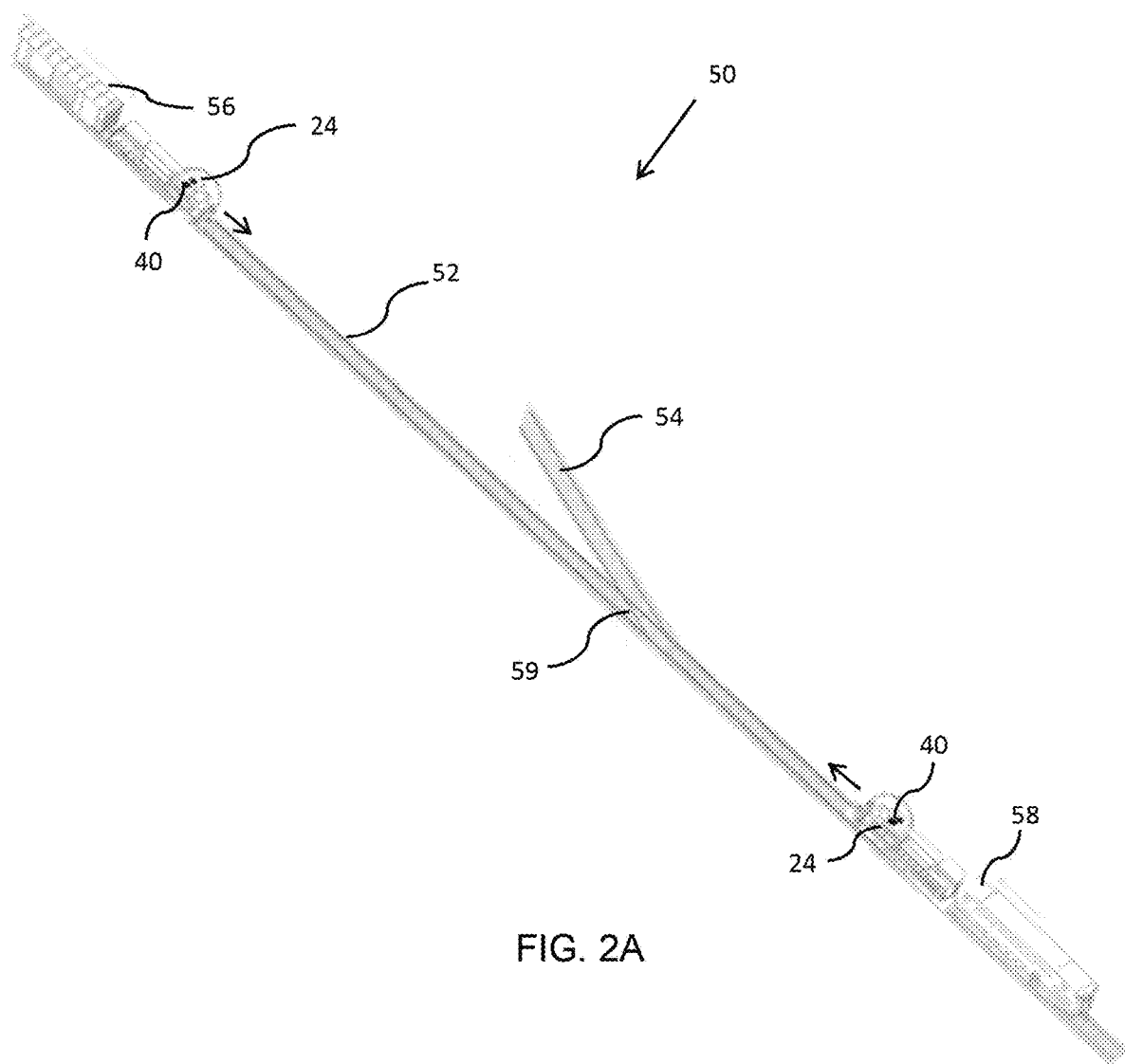
FIGS. 2A-2C are schematic, pictorial illustrations of a railway system including two trains equipped with the monitoring system, according to an embodiment of the present invention.
Figure 2B:
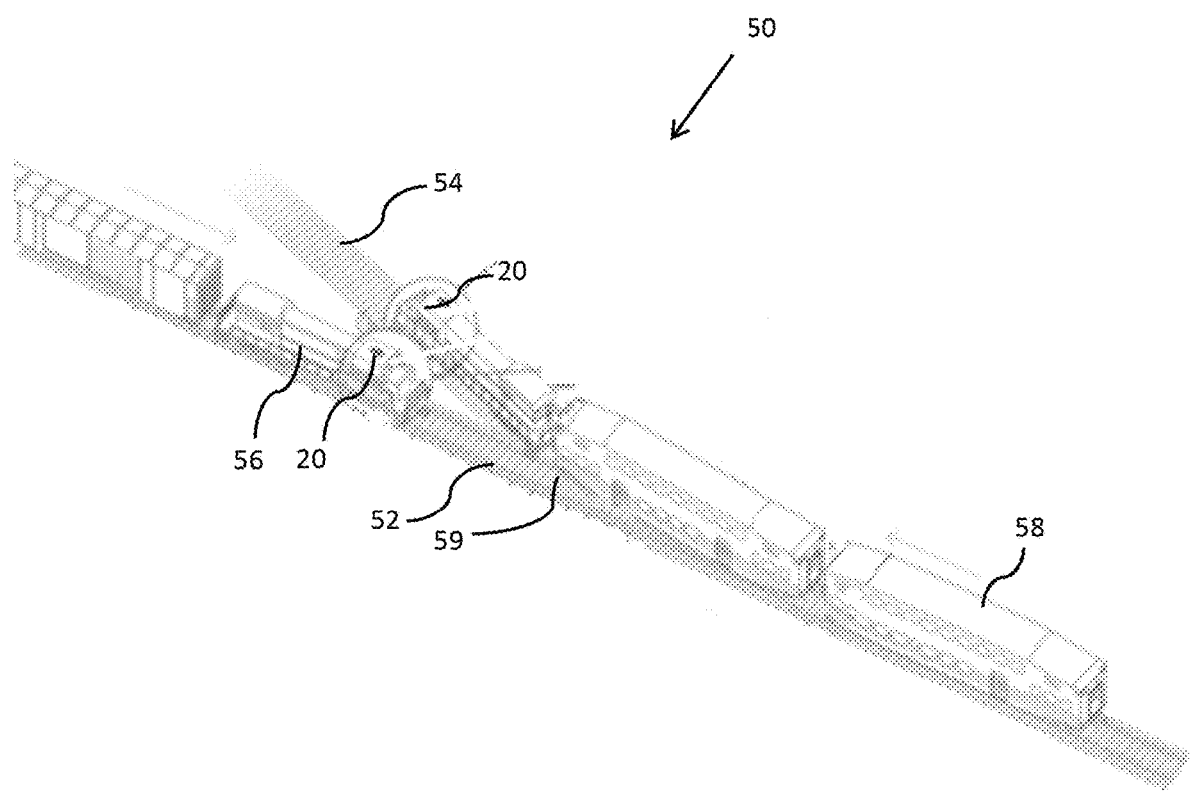

FIGS. 2A and 2B are schematic, pictorial illustrations of a portion 50 of a railway system including a track 52, the track having a low curvature, on which a first train 56 and a second train 58, are traveling, both equipped with the monitoring system described above, according to an embodiment of the present invention. As indicated in FIG. 2A, the trains at a given moment may be traveling towards each other on the same track 52. Typically such an incident might be due to a timing or switching. On the portion 50 of the system illustrated in FIGS. 2A and 2B, a turnout track 54 provides a route for the second train 58 to travel in order to avoid a collision with the first train 56. The turnout track joins the track 52 at a switch or junction 59.

Installed towards the front of both trains are camera transceivers 24 and reflectors 30 of the monitoring system 20, as described above. Light emitted from the camera transceivers is reflected from reflectors of the opposing trains and in turn sensed by the image sensors of the camera transceivers. The processors receive the images, identify the reflections, and determine the speeds and locations of the opposing trains. Based on the speeds and locations of both trains, the processors each determine whether or not the train 58 can turn onto the track 54 and avoid a collision without either train changing speed, or whether one or both of the trains needs to change its speed or stop.

FIG. 2B illustrates a scenario whereby the train 58 proceeds on the track 54, while the train 56 stops. In the scenario shown the train 56 must stop, as it would otherwise reach junction 59 before the full length of 56 could pass, thereby causing a collision. In an alternative scenario, the train 56 might have to stop to avoid being hit, or the train 58 would increase its speed, and the train 56 might decrease its speed, such that neither train would have to stop.

Figure 2C:
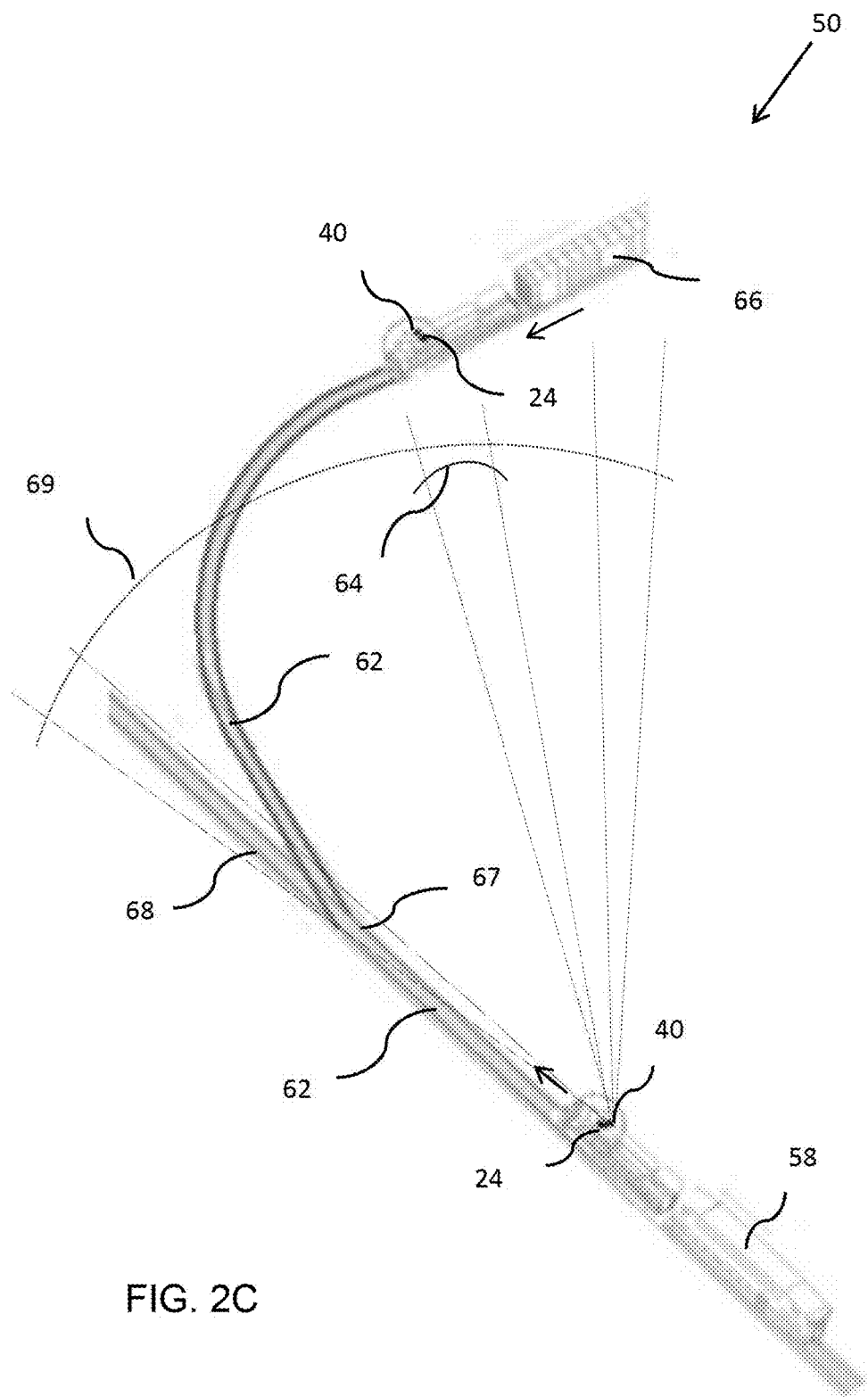

FIG. 2C is schematic, pictorial illustrations of a portion 60 of the railway system, including a track 62 having a high curvature, on which trains 58 and 66 are traveling, both equipped with the monitoring system 20 described above, according to an embodiment of the present invention. On the train 58, the processor of the monitoring system 20 operates the camera transceiver of the train to scan a field of view 64, which is a relatively narrow angle of a scan angle 69. The servo motor sensors 27, described above, are configured to enable the field of view 64 of the camera transceiver to "pan" the scan angle 69. The processor processes acquired images of the scan to identify in the images the reflectors 30 of the train 66. As described above, reflectors are typically installed on the rear or front of all trains. Also the processor may adjust lenses of the camera transceiver so that the track and possible obstacles on the track remain in the field of view of the camera.

Figure 3:
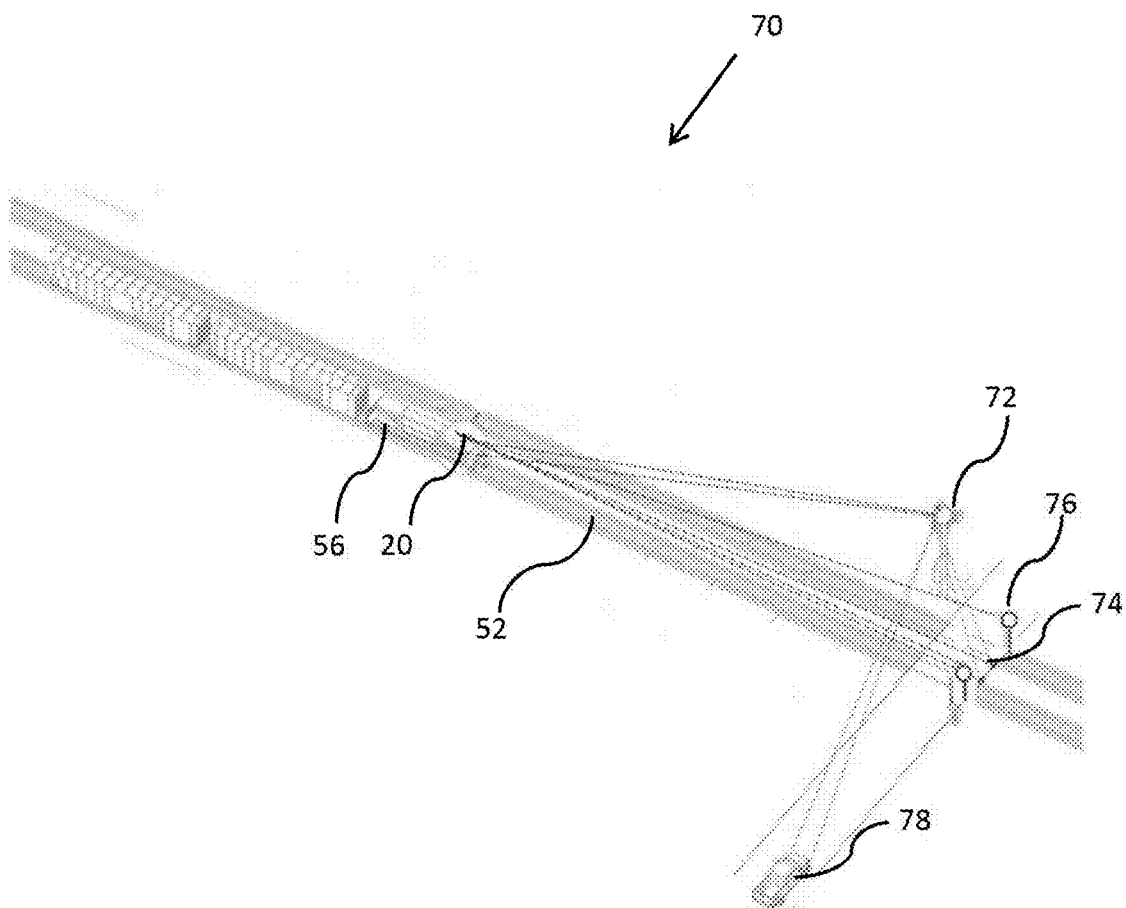
FIG. 3 is a schematic, pictorial illustration of a railway system including a train and a railway crossing tower equipped with the monitoring system, according to an embodiment of the present invention.

FIG. 3 is a schematic, pictorial illustration of a scenario in which the train 56 is traveling is traveling on train system portion 70 towards a railway crossing 74, elements of monitoring system 20 being installed on the train, according to an embodiment of the present invention. The illustrated portion 70 of the railway system includes a crossing tower, or a warning tower 72, positioned before the road crossing. The warning tower may also include elements of monitoring system 20, as described further herein below. Reflectors 76 may also be installed at the junction to indicate the presence of the junction. In embodiments of the present invention, the warning tower 72 detects a vehicle 78 traveling towards the junction and determines the vehicle's speed. The warning tower also determines the location and speed of the train 56. If the vehicle is not slowing to stop before reaching the junction (or alternatively, is not traveling fast enough to pass the junction before the train), the tower may send to the train 56 a signal, by means of the light emitter of the watch tower's camera transceiver, or by wireless communication network, to indicate the potential collision. The signal is recorded by the camera transceiver of the train 56 and an image sent to the monitoring processor 22 of the train 56. The monitoring processor 22 is configured to analyze the signal to determine whether the train should slow down or stop.

Figure 4:
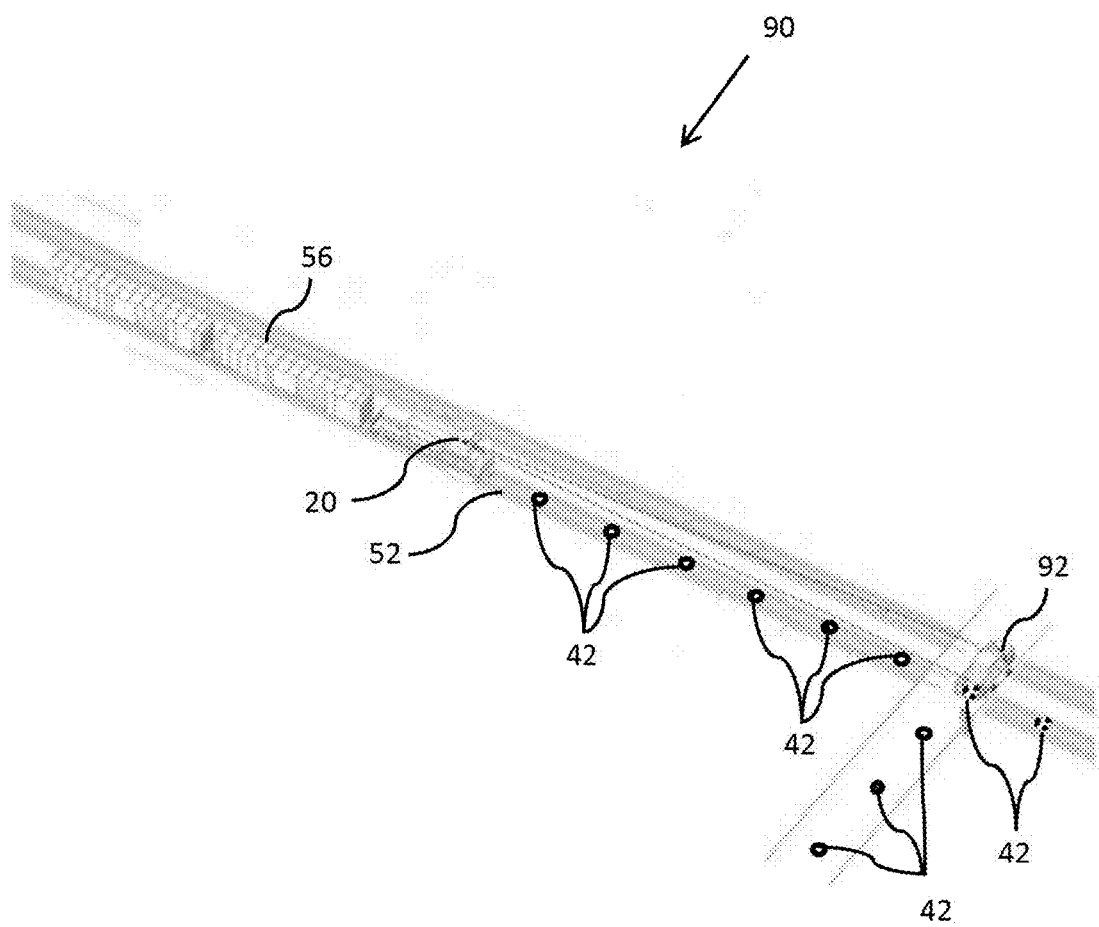
FIG. 4 is a schematic, pictorial illustrations of a railway system including a train equipped with the monitoring system and tracks having "cat eye" reflectors, according to an embodiment of the present invention.

FIG. 4 is a schematic, pictorial illustrations of a railway system portion 90, on which is traveling the train 56, which has installed elements of the monitoring system 20, according to an embodiment of the present invention. The track 52 may be laid out with "cat eye" track reflectors 42, typically ground-mounted retro reflectors. The monitoring processor 22 of the monitoring system 20 is configured to recognize if a view of a track reflector is obstructed, meaning that there is an obstruction on the track. FIG. 4 shows an example, whereby a vehicle 92 has stopped on the track. The camera transceiver 24 of the monitoring system 20 does not have a view of at least two track reflectors, the view being blocked by the vehicle 92. The blocked view is determined by the monitoring processor 22 from images recorded by the camera transceiver 24.

Figure 5:
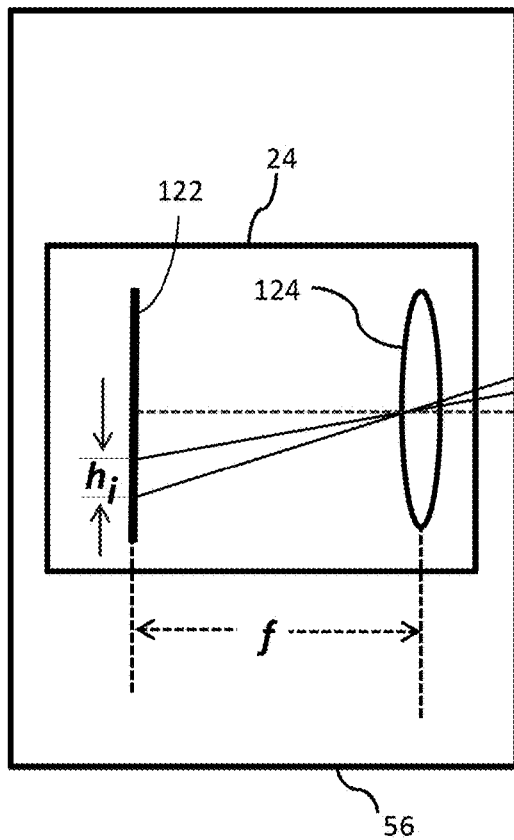
FIG. 5 is a schematic, pictorial illustration of a camera transceiver of the monitoring system, according to an embodiment of the present invention.

FIG. 5 is a schematic, pictorial illustration of camera transceiver 24, installed, by way of example, in the train 56 described above, and configured to record images of an on-coming train, such as train 58, according to an embodiment of the present invention. Reflectors 30 on train 58 appear as pixels in an image recorded on an image sensor 122 of the camera transceiver. The processor is generally configured to detect such pixels, typically by filtering noise from the image as described further herein below. A distance between the reflectors, indicated as distance D, is proportional to a distance between pixels of the reflectors appearing in the images, (indicated in the figure as $h_i$), divided by a focal length, f, of a lens 124 of the camera transceiver 24. The subscript, i, of the parameter h indicates the time of the measurement. It is to be understood that the elements indicated in the figure are for illustration purposes only. For example, lens 124 is illustrative of the actual lens subsystem employed in the camera transceiver.

Figure 6:
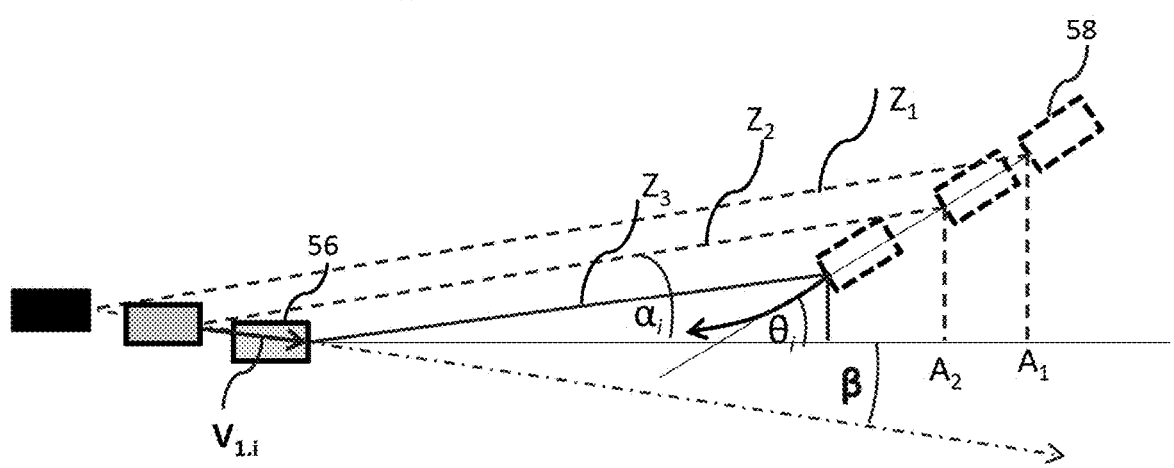
FIG. 6 is a schematic, pictorial illustration of the camera transceiver recording multiple images of an on-coming train, according to an embodiment of the present invention.

FIG. 6 is a schematic, pictorial illustration of in-train camera transceiver 24 in a first train 56 recording multiple images of on-coming train 58, according to an embodiment of the present invention. Multiple images are required in order to determine a velocity v of the on-coming train, which may be determined as a function of the distance, D, between reflectors on the on-coming train.

As shown in the figure, images are recorded at three distinct times, at three respective distances, $z_1$, $z_2$, and $z_3$.

The relations between these distances, the speeds of the passing and on-coming trains, and the lens parameters described above are as follows:

$$z_i = Df * \cos\theta_i \cos\alpha_i / (h_{i+1} - h_i) + \frac{D}{2} * \sin\theta_i \cos\alpha_i (h_{i+1} + h_i) / (h_{i+1} - h_i)$$

$$z_{i+1} \cos\alpha_{i+1} = z_i \cos\alpha_i - v_2 \Delta t * \cos\theta_i - (v_{1,i+1} + v_{1,i})/2 \Delta t * \cos\beta$$

Where:
D: distance between headlights of on-coming train;
$h_i$: distance from headlight pixels in image recorded on sensor of camera relative to the center of the image;
$v_2$: velocity of on-coming train;
$v_{1.1}$, $v_{1.2}$, $v_{1.3}$: velocities of passing train, at three distinct times (separated by a constant time difference), calculated initially during a time period as the vehicle travels from A1 and A2, and subsequently on an on-going basis until the end of the maneuver. Note: the velocity of the train may be changing while proceeding with the maneuver. Until the trains first identify each other:
$v_{1.1} = v_{1.2} = v_{1.3} = v_1$ As indicated in FIG. 5, which is an overhead view of the field of view of the camera transceiver 24, the track may not be straight, but rather curved, in which case the line of site between the camera and the on-coming train may be an angle $\alpha_i$, from a straight projection in the direction of motion of the first train. The angle between that straight projection and the line of the headlights is an angle $\theta_i$ and the angle between the line of site and the passing vehicle may be an angle $\beta$.

The above equation then needs to be adjusted, such that:

$$z_i = Df * \frac{\cos\theta_i \cos\alpha_i}{h_{i+1} - h_i} + \frac{D}{2} * \frac{\sin\theta_i \cos\alpha_i (h_{i+1} + h_i)}{h_{i+1} - h_i}$$

$$z_{i+1} \cos\alpha_{i+1} = z_i \cos\alpha_i - v_2 \Delta t * \cos\theta_i - (v_{1,i+1} + v_{1,i})/2 \Delta t * \cos\beta$$

FIGS. 7A-7D are a schematic, pictorial illustrations of the railway system 50, described above with respect to FIG. 2, during operation of the trains 56 and 58 on the track 52, according to an embodiment of the present invention.

Figure 7A:
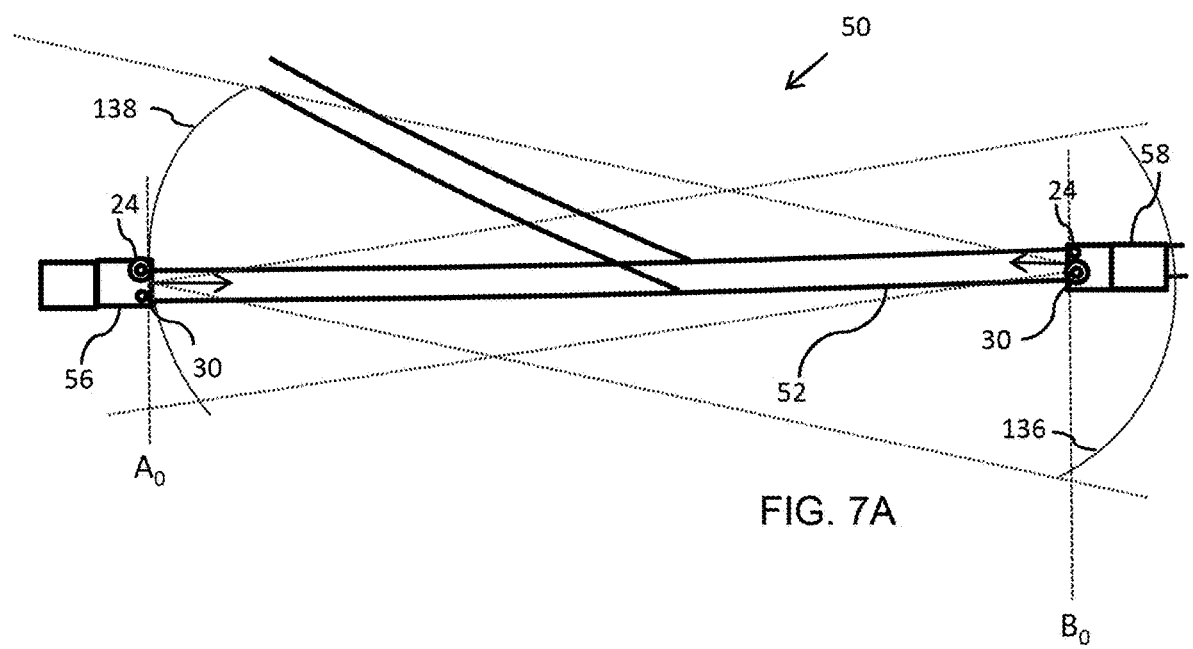
FIGS. 7A-7D are schematic, pictorial illustrations of scenarios of operation of the monitoring system, when there is a risk of a potential collision between two trains on a track with a junction, according to an embodiment of the present invention.

As indicated in FIG. 7A, the trains 56 and 58 are traveling towards each other on track 52. Lights emitted by camera transceivers 24 on the respective trains are reflective by respective reflectors 30 on the trains. Lens systems of the respective camera transceivers, described above with respect to FIG. 5, provide each camera transceiver with a field of view of an area in front of each train. As indicated in FIG. 7A, the train 56 has a field of view 136, and the train 58 has a field of view 138. At a point in time referred to herein below as $T_0$, the train 56 is at a location $A_0$ and the train 58 is at a location $B_0$.

Figure 7B:
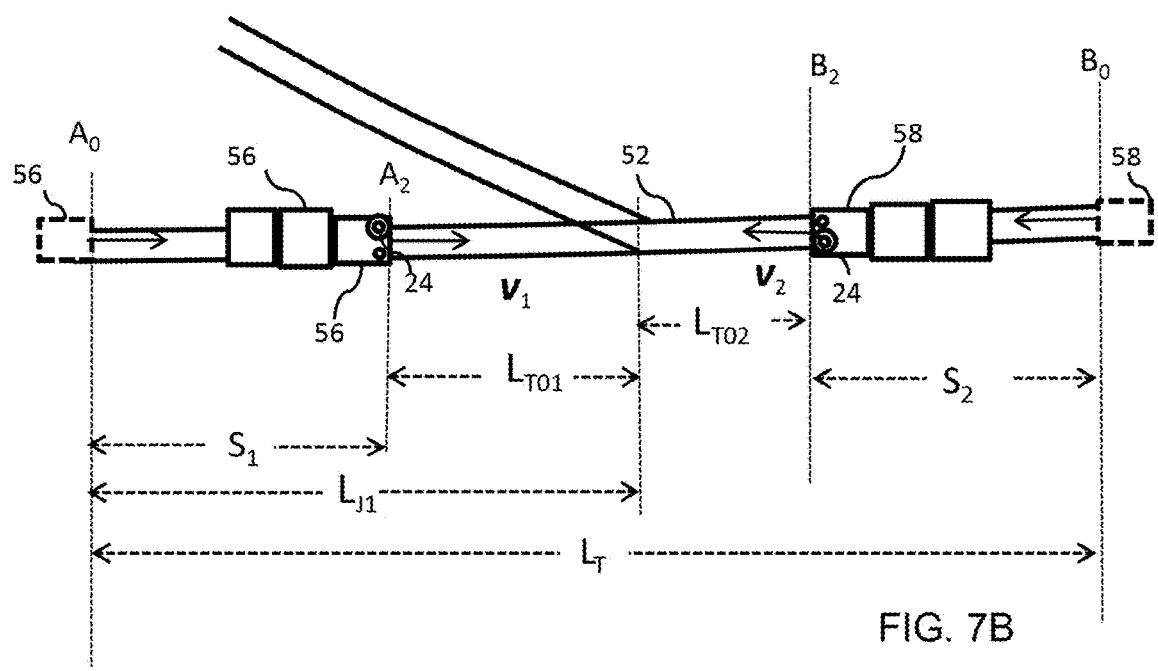

The illustration of FIG. 7B indicates the distance $L_T$ between the trains at time $T_0$ when the trains first identify each other and illustrates a scenario described with respect to FIG. 2B above, where $S_1$ and $S_2$ are respective braking apportionment distances of the two respective trains, whereby both trains must stop to avoid a collision.

$$L_{T01} = v_1 * t_S$$

$$L_{T02} = v_2 * t_S$$

$$t_S = 1 \text{ sec}$$

Assuming the following inequalities hold:

$$S_1 + S_2 + L_{T01} + L_{T02} < L_T$$

$$L_{j1} - S_1 >= L_{T01}$$

then, the train 56 must stop. If on the other hand the following inequality holds:

$$L_{j1} - S_1 < L_{T01}$$

then both trains must stop.

Figure 7C:
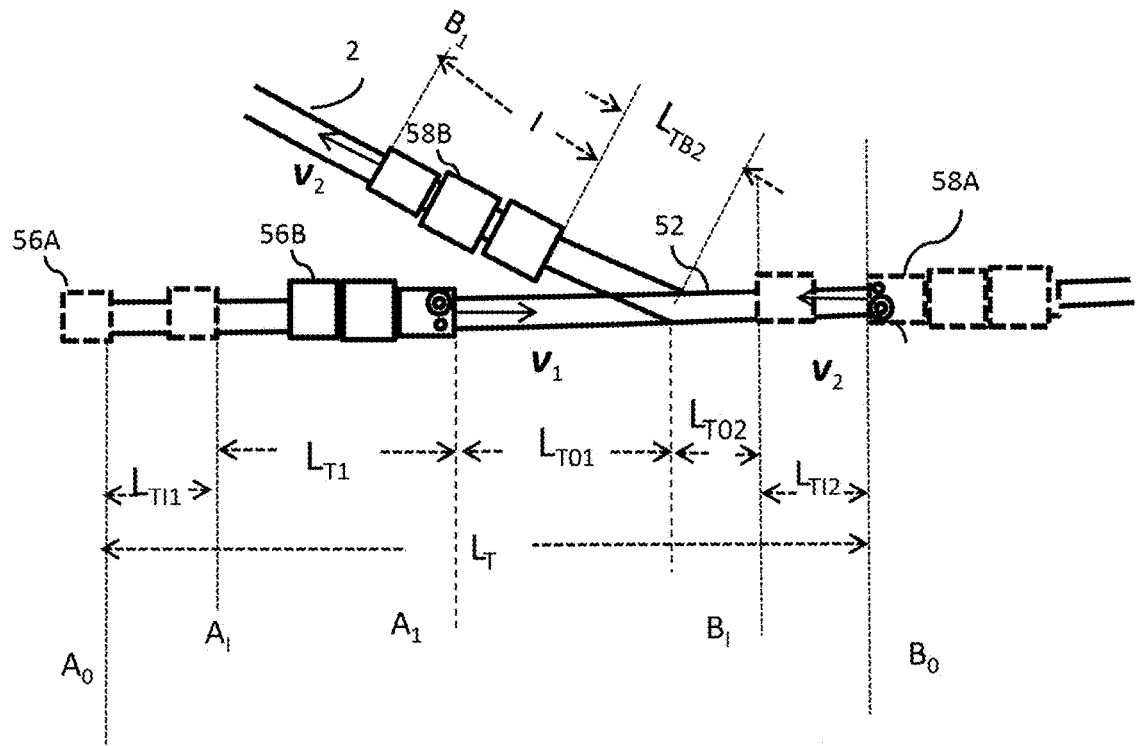

The illustration of FIG. 7C indicates the distance $L_T$ between the trains when the trains first identify each other that determine the minimum distance at which the monitoring systems on the trains must be capable of recognizing on-coming trains. These parameters are: the maximum permissible speed of the trains on the railway system ($v_1$, $v_2$ for respective trains 56 and 58); the braking distance given the maximum permissible speed ($L_{T01}$, $L_{T02}$ for respective trains 56 and 58); and the maximum length, l, of the train 58. Then:

$$L_{T01} = v_1 * t_S$$

$$L_{T02} = v_2 * t_S$$

$$L_{TB2} = v_2 * t_S$$

$T_I$—Identification time $$L_{TI} = L_{TI1} + L_{TI2}$$

$L_{TI}$—Shortening the distance between trains until they first identify each other ($z_3 - z_1$).

$$L_{TI1} = v_1 * T_I$$

$$L_{TI2} = v_2 * T_I$$

$$(L_{T02} + L_{TB2} + L_{TI2} + 1)/v_2 = (L_{T01} + L_{T1} + L_{TI1})/v_1$$

$$L_{T1} + L_{T01} + L_{TI1} = (L_{T02} + L_{TB2} + L_{TI2} + 1) * v_1/v_2$$

$$L_T = (L_{T01} + L_{TI1} + L_{T1}) + L_{T02} + L_{TI2}$$

$$L_T = (L_{T02} + L_{TB2} + L_{TI2} + 1) * v_1/v_2 + L_{T02} + L_{TI2}$$

Assuming for example a maximum speed $v_1=201$ km/h (e.g., class 7 on the U.S. Northeast Corridor) and a minimum speed v2=97 km/h, and a straight line length of 1672 m (e.g., freight trains—class 4), to obtain a measurement precision of 7%, assuming a 40-megapixel camera, and an identification time ($T_I$) of 9.7 sec, and $t_s=1$ sec, then:

$$L_T=(v_2*t_S+V_2*t_S+V_2*T_1+1)*v_1/v_2+v_2*t_S+v_2*T_1$$

$$L_T=v_1*t_S+v_1*t_S+v_1*T_I+1*v_1/v_2+v_2*t_S+v_2*T_I$$

$$L_T=(2*v_1+v_2)*t_S+(v_1+v_2)*T_I+1*v_1/v_2$$

$$L_T=(2*55.83+26.94)*1+(55.83+26.94)*9.7+1672*55.83/26.94$$

$$L_T=4406 \text{ m}$$

$L_T$ is the minimum distance between trains when the identification must occur. For the parameters in the example, the value must be 4715 meters (including the speed measurement inaccuracy).

Figure 7D:
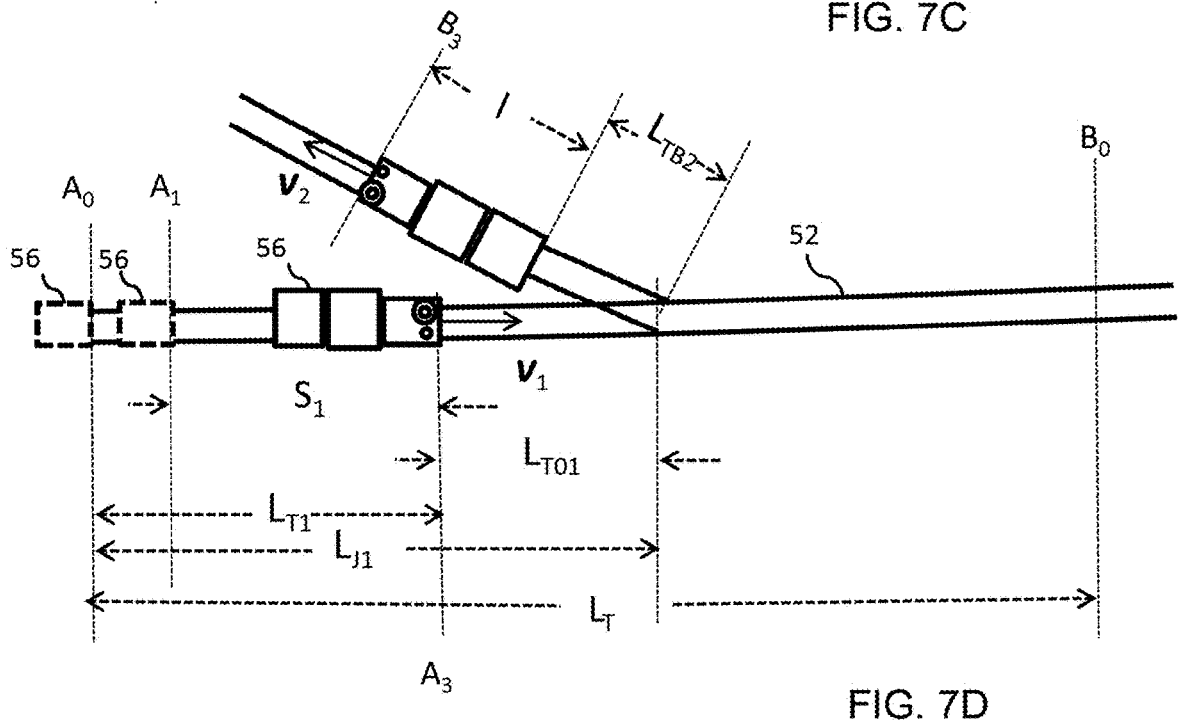

In further embodiments, the length of the train 58 may be considered. The train 56 does not have to stop if the train 58 can clear the junction by its entire length before train 56 reaches the junction. FIG. 7D illustrates a scenario described with respect to FIG. 2B above, whereby the train 56 either stops or continues depending on the length of the train 58. The length of the train 58 can be communicated to the train 56 by light signals related to reflectors 30 on the train 58. A length can be communicated by installing a reflector for each unit length of train, or by providing a shutter with each reflector, set to permit reflection at regular intervals that indicate, such that the frequency is indicative of the length.

A margin of stop time, $t_S$, may be calculated, as the amount of time by which the second train 58, clears the junction before the first train, the train 56, reaches the junction. If this time is calculated to be greater than a preset value, such as 1 second, then both trains are allowed to proceed. If $t_S$ is less than a preset value, then one or both of the trains must stop. The calculation of $t_S$ is as follows:

$$L_{T01}=v_1*t_s$$

$$L_{TB2}=v_2*t_S$$

$$v_2*T=L_T-L_{j1}+L_{TB2}+1$$

$$v_2*T=L_T-L_{j1}+v_2*t_S+1$$

$$T=(L_{j1}-v_1*t_S)/v_1$$

$$v_2*(L_{j1}-v_1*t_s)/v_1=L_T-L_{j1}+v_2*t_S+1$$

$$v_2*L_{j1}/v_1-v_2*t_S=L_T-L_{j1}+v_2*t_S+1$$

$$2*v_2*t_S=v_2/v_1*L_{j1}+L_{j1}-L_T-1$$

$$t_S=L_{j1}(\tfrac{1}{2}v_1+1/v_2)-(L_T+1)/v_2$$

Figure 8:
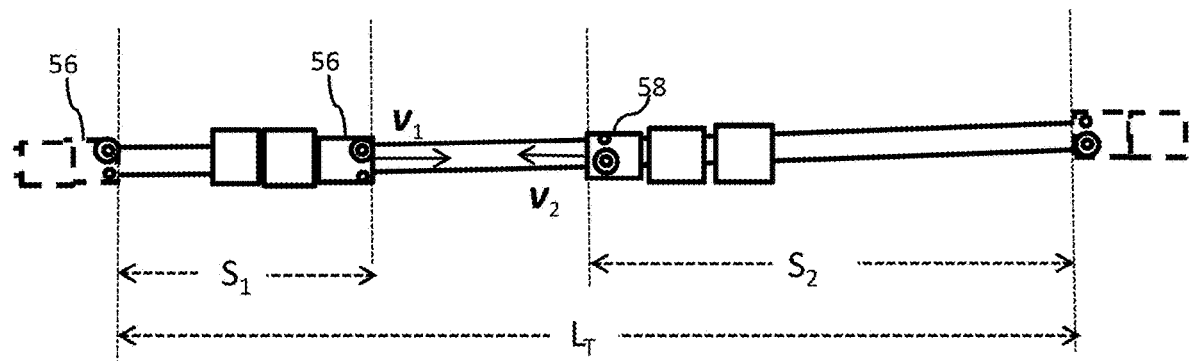
FIG. 8 is a schematic, pictorial illustration of a scenario of operation of the monitoring system, when there is a risk of a potential collision between two trains on a track without a junction, according to an embodiment of the present invention.
Figure 9:
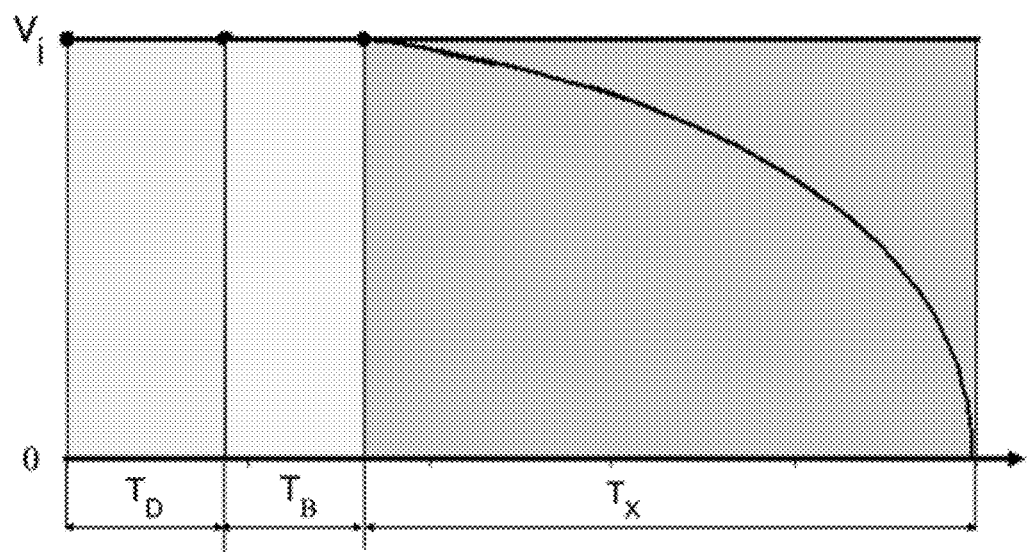
FIG. 9 is a graph of train velocity, indicating the train deceleration due to braking, according to an embodiment of the present invention.

FIG. 8 illustrates a scenario in which no junction separates the two trains. If the trains are traveling towards each other the trains need to stop, but the abruptness of the deceleration can be controlled. FIG. 9 is a graph of train velocity, indicating the train deceleration due to braking. Assuming that various levels of braking deceleration can be applied, the appropriate level is determined by the following equations:

$$S_1+S_2+(v_1+v_2)*t_S=L_T$$

$$S_1=x_I+v_1*(T_D+T_B)$$

$$S_2=x_2+v_2*(T_D+T_B)$$

$$x_1+x_2+(v_1+v_2)*(t_S+T_D+T_B)=L_T$$

where, $S_1$ and $S_2$ are respective actual braking distances, $x_1$, $x_2$ are respective breaking distances of the two respective trains, and $x_D$ and $x_B$ are respective distances corresponding to the driver supervision time $T_x$—Braking time
$T_D$—Driver supervision time assume 9 sec.
$T_B$=Emergency brakes build up time assume 5 sec
$T_1$=Identification time to driver supervision time 9 sec
$t_S=1$ sec Then:

$x_1=x_2=1536$ m—braking distances of the two trains (not including any speed measurement inaccuracy).

$$v_1=v_2=160 \text{ km/h}$$

$L_T=4405$ m $L_T$ is the minimum distance between trains when the identification must occur. For the parameters in the example, the value must be 4715 meters (including the speed measurement inaccuracy).

Alternatively, the trains are traveling in the same direction, but the front train is traveling slower than the back train. The monitoring system of the back train detects the front train and determines the safe speed of travel of the back train.

10A-10H are schematic, pictorial illustrations of a railway system 90, on which the train 56 is approaching the railway crossing 74 at which non-rail vehicles may pass, as described above with respect to FIG. 3. The warning tower 72 situated near the crossing 74 includes at least one monitoring system 20, which has several fields of view, 142, 144, and 146. The field of view 142 provides a view of a vehicle 140, which is approaching the crossing along a road 150, which may be configured with reflectors 42.

Field of view 144 provides a view of the crossing itself, which may also be configured with reflectors 42. Field of view 146 provides a view of the train 56, which, like the vehicle, is approaching the crossing.

The camera transceiver 24 of the train 56 also has a field of view 148, which provides a view of the crossing and the warning tower. As the vehicle 140 and the train 56 approach the crossing, the warning tower detects images of the vehicle 140 and the train 56 at a time $T_0$ (that is, although the vehicle and the train may not be detected at the same instant, they are both detected at time $T_0$). The train may be detected by light from the warning tower reflected by the reflectors 30 on the train. The vehicle may be detected by light from the warning tower reflected from the vehicle itself, such as from the vehicle headlights, or a vehicle registration plate (license plate), or from reflectors, similar to the train reflectors 30, which may be installed on the vehicle. Alternatively or additionally, the vehicle may be detected by a lack of reflection from the road reflectors 42 located on the road.

In response to detecting the vehicle and the train at time $T_0$, the processor of the warning tower monitoring system determines the respective speeds and locations of the vehicle and train, by the process described above with respect to FIGS. 5 and 6. The monitoring processor 22 may then signal the vehicle 140 and/or the train 56 of an impending threat of collision. A notification to the train from the warning tower, may be provided by emitting from the light emitter of the warning tower camera transceiver a pulsed light that indicates the warning. Alternatively, light from the train and reflected the warning tower may be pulsed by controlling a reflector shutter, as described further herein below. In particular, the train must be warned as to whether to stop, to slow down or to speed up.

Similar means of notification may be provided to the vehicle, if the monitoring system is also installed on the vehicle. Alternatively, a standard railroad crossing light may be controlled by the warning tower to signal the impending arrival of the train.

Figure 10A:
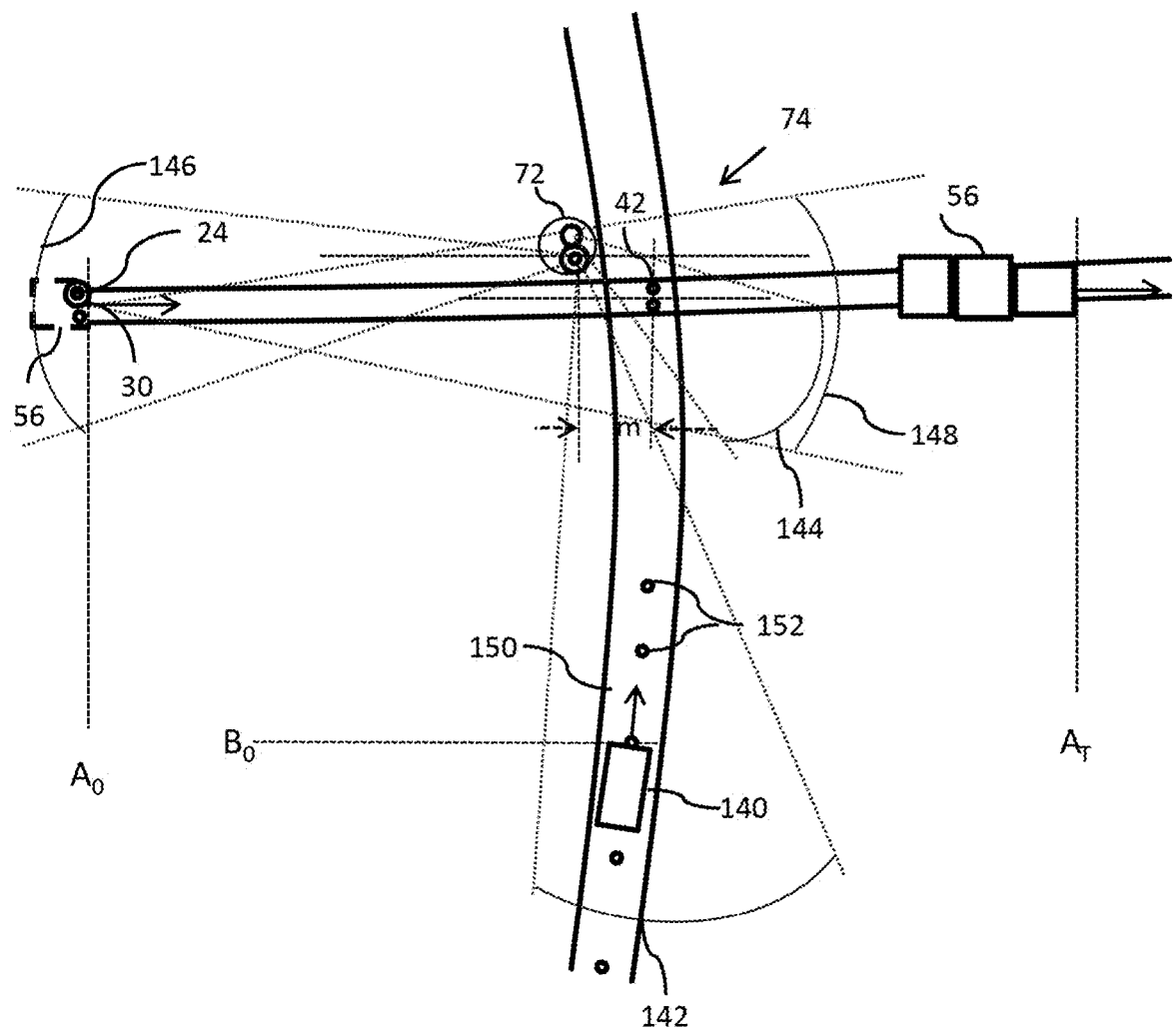
Figure 10B:
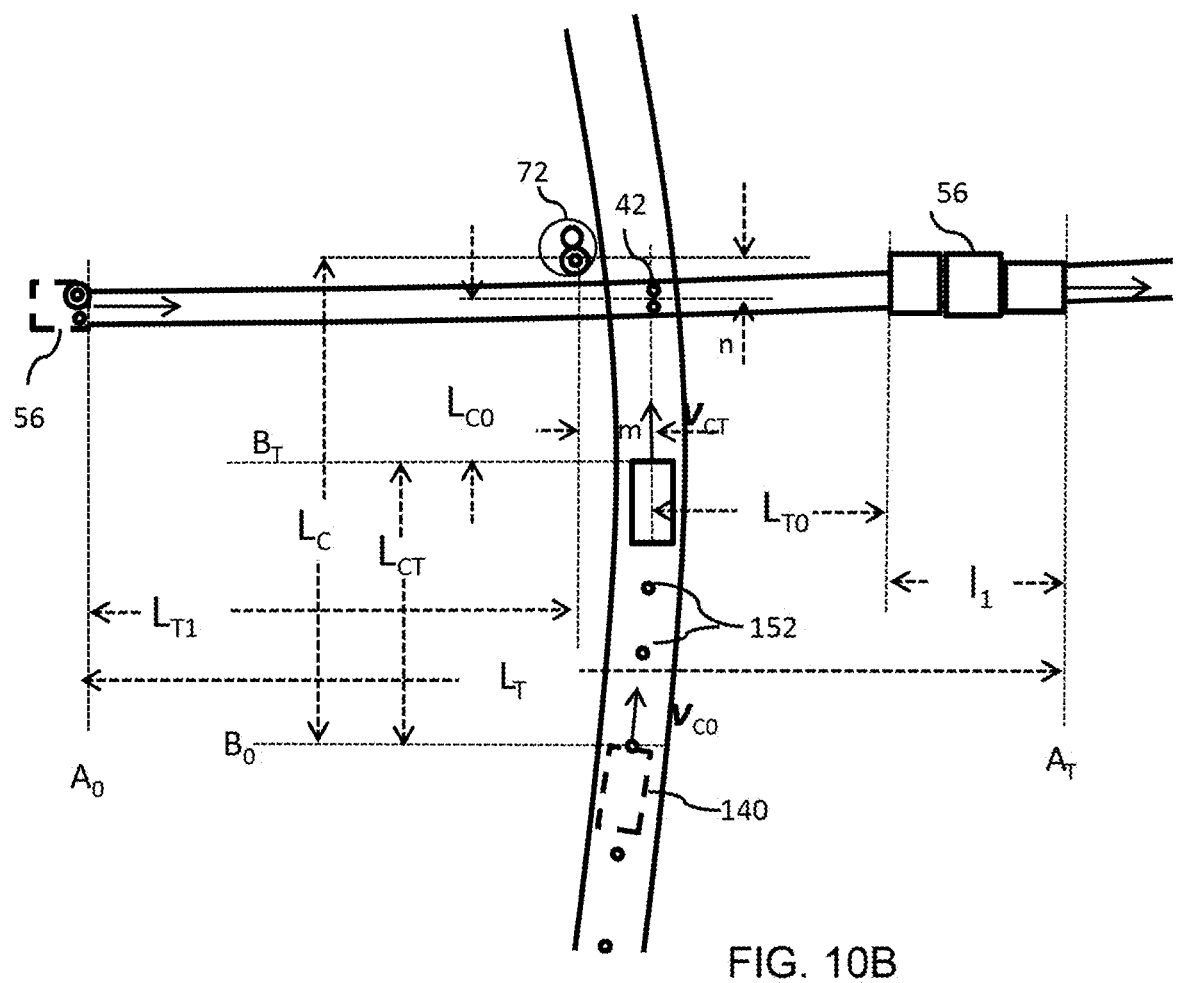

In the scenario illustrated in FIG. 10A, the train can clear the junction before there is a collision with the vehicle 140, such that the train, after clearing the track reaches a point $A_T$. Parameters related to the train movement are indicated in FIG. 10B. A calculation as to whether or not the train can proceed without hitting the vehicle is as follows:

$$L_{T0}=v_T*t_T$$

$$L_T=v_T*T$$

$$L_{T1}+m+L_{T0}+l_1=L_T$$

$$L_{T1}+m+V_T*t_S+l_1=V_T*T$$

$$T=(L_T+m+V_T*t_S+l_1)/V_T$$

$$L_C-n-L_{C0}=L_{CT}$$

$$L_C-n-v_C*t_T=v_C*(L_T+m+V_T*t_S+l_1)/V_T$$

$$V_C=(v_{C0}+V_{CT})/2$$

$$L_C-n-v_C*t_T=V_C*(L_T+m+V_T*t_S+l_1)/V_T$$

$$L_C-n-v_C*t_T=v_C*(L_T+m+l_1)/V_T*V_C*t_T$$

$$2*V_C*t_T=L_C-n-v_C*(L_T+m+l_1)/V_T$$

$$t_T=(L_C-n)/2V_C-(L_T+m+l_1)/2 \quad V_T>=1 \text{ sec}$$

The parameter $t_T$ is the amount of time by which the train passes the intersection before the vehicle reaches the intersection. When this is greater than 1 second, the train can safely continue without slowing down.

Figure 10C:
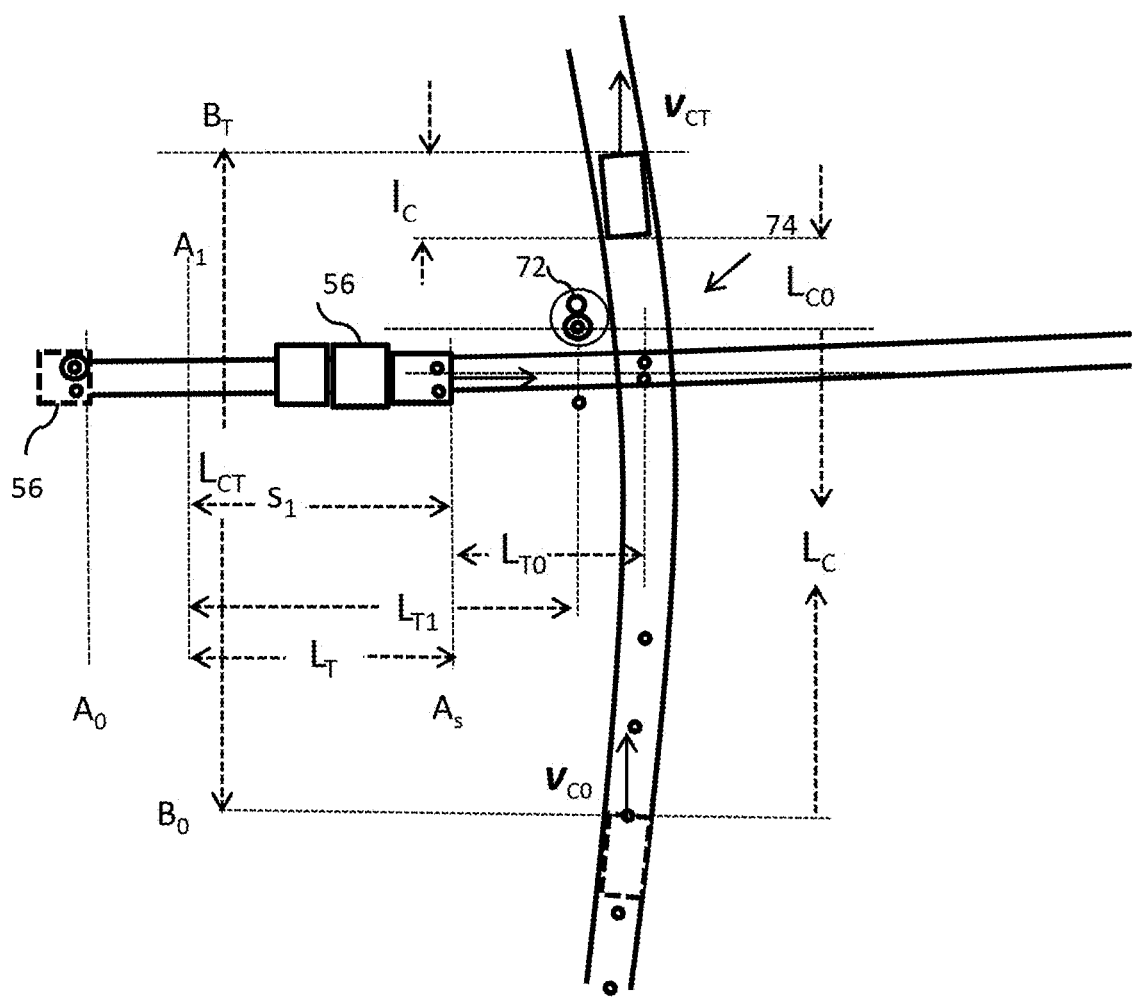

In a further scenario, the train cannot clear the junction without causing a collision with the vehicle 140. Consequently, the train must stop at a point $A_S$ before the junction. Parameters for this scenario are indicated in FIG. 10C. A calculation as to whether or not the train can proceed without hitting the vehicle is as follows:

$$L_{T0}=v_T*t_S$$

$$L_T=V_T*T$$

$$L_{T1}+m-L_{T0}=L_T$$

$$L_{T1}+m-v_T*t_S=v_T*T$$

$$T=(L_{T1}+m-V_T*t_S)/v_T$$

$$L_{CT}-l_C-L_{C0}+n=L_C$$

$$v_C*(L_{T1}+m-v_T*t_S)/v_T-l_C-v_C*t_S+n=L_C$$

$$v_C=(v_{C0}+v_{CT})/2$$

$$v_C*(L_{T1}+m)/v_T-l_C-2v_C*t_S+n=L_C$$

$$v_C*(L_{T1}+m)/v_T-l_C-L_C+n=2v_C*t_S$$

$$(L_{T1}+m)/2v_T-(l_C+L_C-n)/2v_C=t_s$$

The equations to determine the length of vehicle 140, as illustrated in FIG. 10D, are as follows:

$$l_C+k*L_C/m=_{C0}*T_2$$

$$l_C+L_{C1}+k*(L_C-L_{C1})/m=v_{C0}*T_3$$

$$l_C+L_{C1}+k/m*L_C-k/m*L_{C1}=v_{C0}*T_3$$

$$v_{C0}=L_{C1}/T_1$$

$$L_{C1}-k/m*L_{C1}=T_3/T_1-L_{C1}*T_2/T_1$$

$$k/m*L_{C1}=L_{C1}-L_{C1}*T_3/T_1+L_{C1}*T_2/T_1$$

$$k/m=1-T_3/T_1+T_2/T_1=1-(T_3-T_2)/T_1$$

$$l_C=L_{C1}*T_2/T_1-L_C*[1-(T_3-T_2)/T_1]$$

Figure 10F:
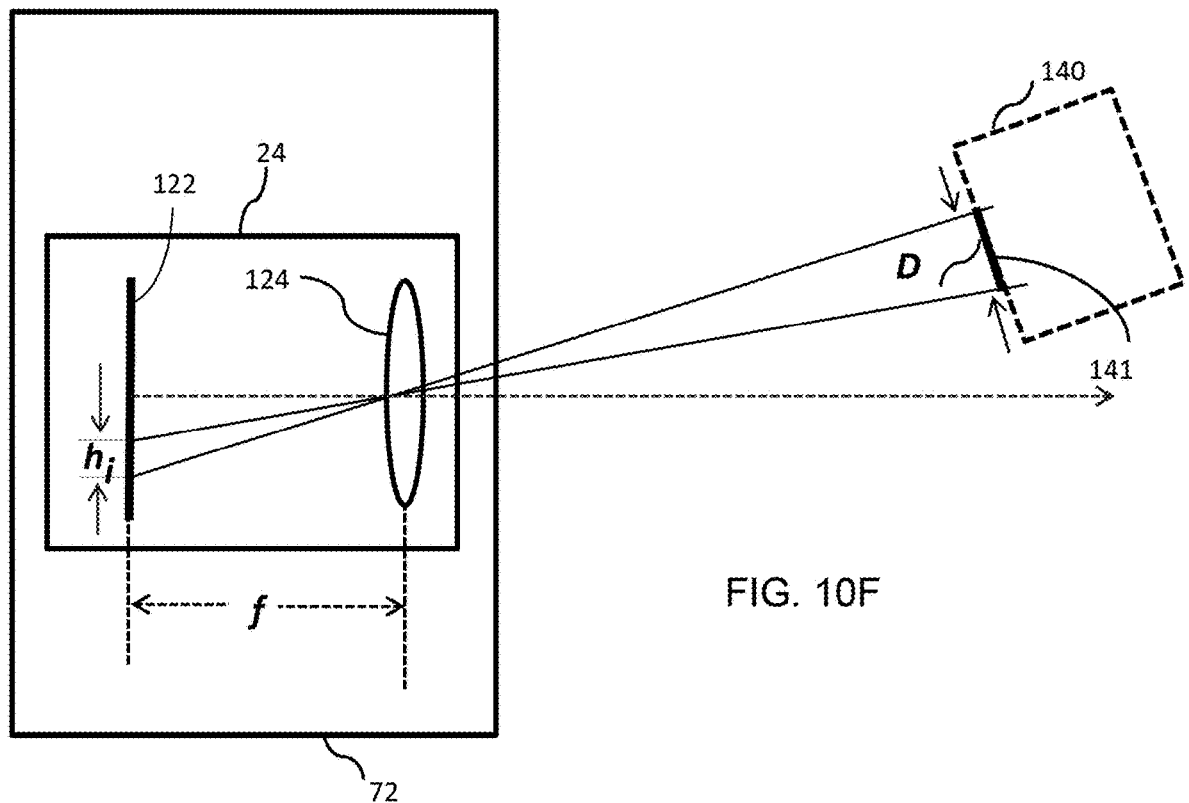

FIG. 10F is a schematic, pictorial illustration of camera transceiver 24, installed, by way of example, on the warning tower 72, and configured to record images of an on-coming vehicle, such as the vehicle 140, according to an embodiment of the present invention. A registration plate 141 (license plate) or headlights of the vehicle appear as pixels in an image recorded on an image sensor 122 of the camera transceiver. The processor is generally configured to detect such pixels, typically by filtering noise from the image as described further herein below. A length of the registration plate, or distance between headlights of vehicle, indicated as distance D, is proportional to a distance between pixels of the reflectors appearing in the images, (indicated in the figure as $h_i$), divided by a focal length, f, of a lens 124 of the camera transceiver. The subscript, i, of the parameter h indicates the time of the measurement. It is to be understood that the elements indicated in the figure are for illustration purposes only. For example, lens 124 is illustrative of the actual lens subsystem employed in the camera transceiver.

Figure 10G:
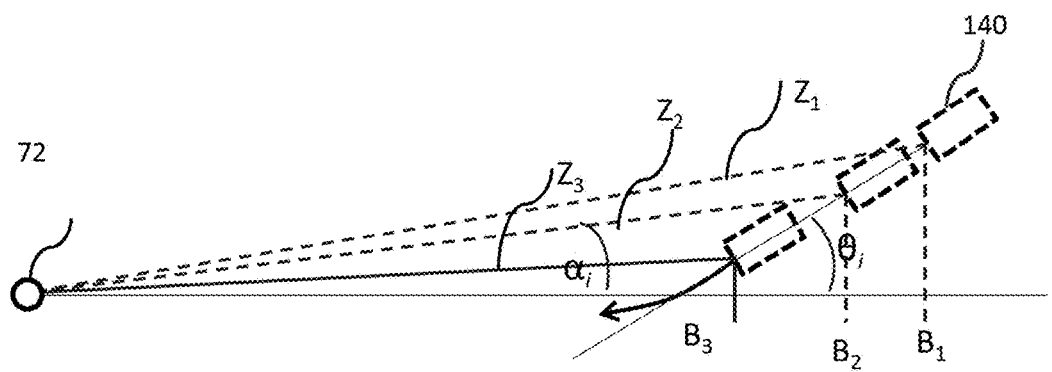

The equations to determine the velocity of vehicle 140, in the scenario illustrated in FIG. 10G, are as follows:

$$z_i = Df * \frac{\cos\theta_i \cos\alpha_i}{h_{i+1}-h_i} + \frac{D}{2} * \frac{\sin\theta_i \cos\alpha_i(h_{i+1}+h_i)}{h_{i+1}-h_i}$$

$$z_{i+1}\cos\alpha_{i+1} = z_i\cos\alpha_i - v_C\Delta t * \cos\theta_i$$

Where:
D: Registration plate length or distance between headlights of vehicle.
$h_i$: distance from headlight pixels in image recorded on sensor of camera relative to the center of the image;
$v_C$: velocity of the vehicle 140;

The calculation of parameter $t_S$ for the vehicle 140 is as follows and is illustrated in FIG. 10E:

$$V_0=(L_{C1}-J_0+J_1)/T_1$$

$$J_0=b*L_C/h$$

$$J_1=b*(L_C-L_{C1})/h$$

$$V_0=L_{C1}*(1-b/h)/T_1$$

$$V_{C0}=L_{C1}/T_1$$

$$V_0=V_{C0}*(1-b/h)$$

$$V_{C0}=V_0/(1-b/h)$$

Figure 10H:
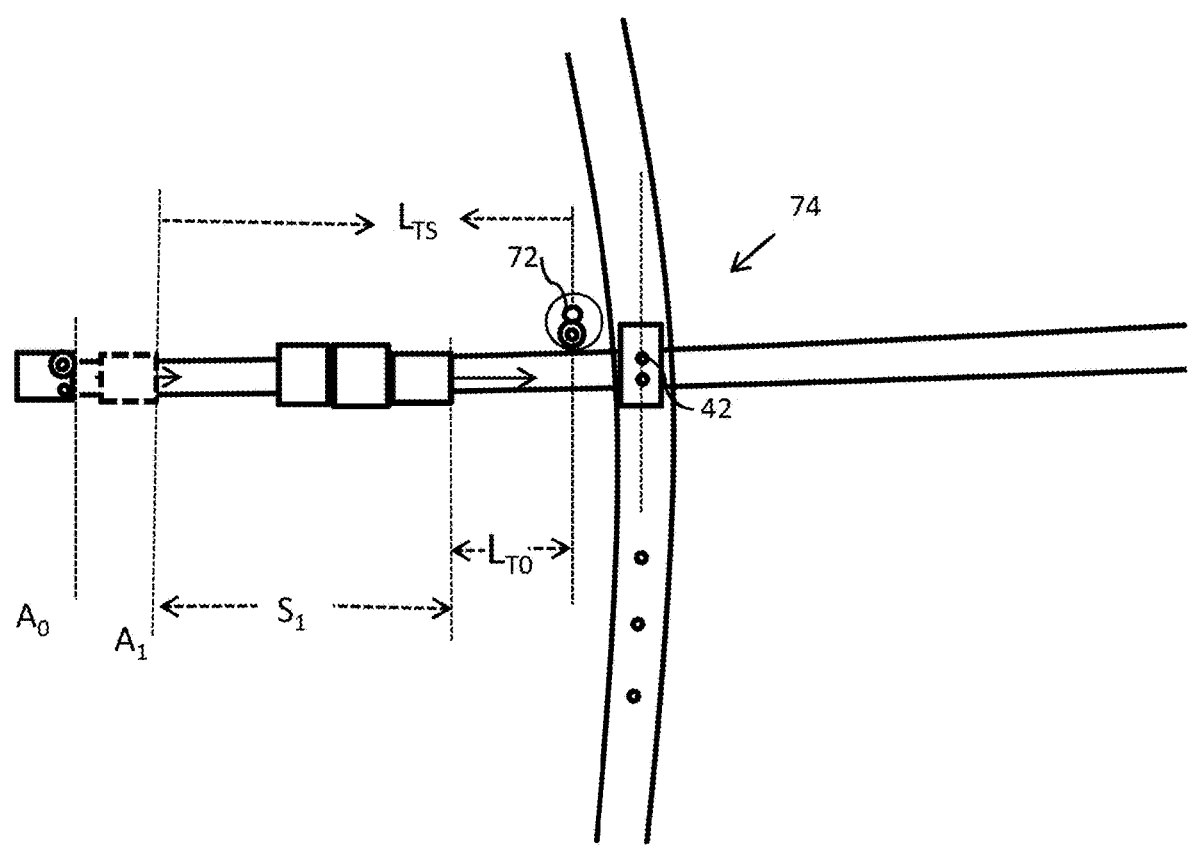

$T_S \geq 1$ SEC $t_S \geq 1/(1-b/h)$ if b=0.5 m max, h=3 m min–$t_S \geq 1.2$ SEC In a further scenario, illustrated in FIG. 10H, the vehicle 140, or some other obstacle, is stopped at the junction. The warning tower detects the presence of the vehicle because the track reflectors 42 are obscured. Consequently, the train must stop before reaching the junction. Whether or not the train can stop using regular braking or not is determined by the following equations:

$L_{TO} = V_T * t_S$ $s_1 + L_{TO} - m = L_{TS}$ $s_1 + v_T * t_S - m = L_{TS}$

Figures 11A, 11B:
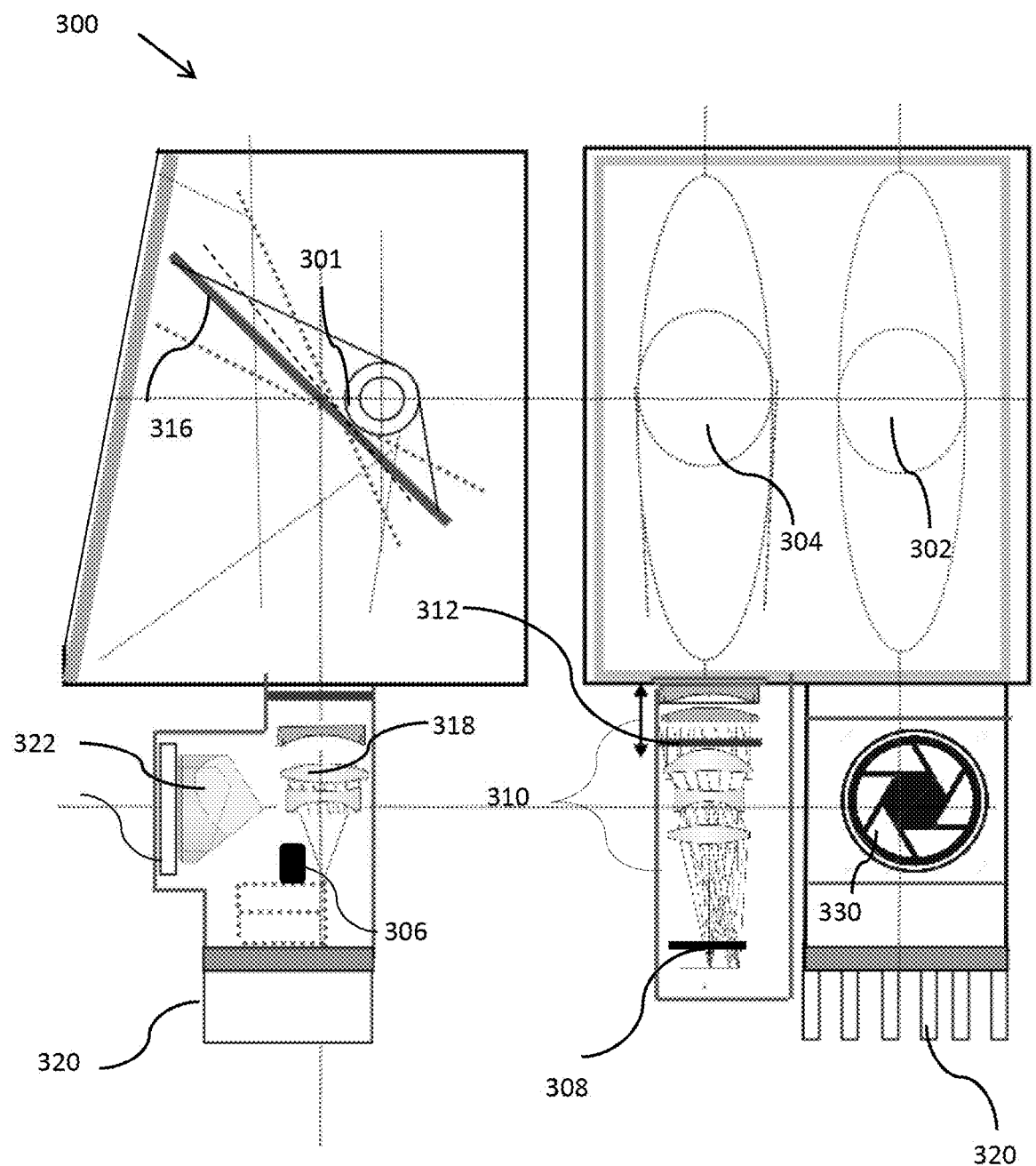
FIGS. 11A and 11B are pictorial orthogonal views of a camera transceiver of the monitoring system, according to an embodiment of the present invention.

FIGS. 11A and 11B are orthogonal illustrations of a camera transceiver 300, according to an embodiment of the present invention. The camera transceiver includes a light emitter aperture 302 and an image sensor aperture 304, for transmission of light from a light emitter 306 and image capture by an image sensor 308. Panning of the camera transceiver line of sight is performed by a mirror system 316 and servo sensors 301. As described above, the image sensor is typically a high resolution CMOS sensor, providing sufficient resolution to detect the reflected light of oncoming trains at distances according to the speed of trains in the rail system, such as was calculated above with respect to FIG. 7B. The light emitter is typically a narrow bandwidth infrared laser, such as an 830 nm diode bar. The power, dispersion, and duty cycle of the emitter are configured to conform to the International Electro technical Commission (IEC) 60825-1 standard for safety of laser products An image sensor lens subsystem 310 and the mirror system 316 can be controlled by the processor to adjust the camera transceiver field of view (FOV), including orientation, zoom and focus, as described above. A light emitter lens subsystem 318 can be similarly controlled to control the field of light dispersion. In alternative embodiments, the image sensor and light emitter can be positioned to share a single aperture, with some common mirroring and lens subsystem elements. Before the trains first identify each other, the FOV of the image sensor is set to be approximately the same as the field of dispersion of the light emitter. Typically the image sensor lens subsystem also includes a band pass filter 312, as well as an interference filter, configured at the wavelength of the emitter, such as 830 nm. The image sensor lens subsystem also includes an optical zoom.

Typically a train has one or more reflectors installed, as described above. One such reflector, indicated as a retro reflector 322, may be incorporated within the camera transceiver. The reflector 322 may also return pulsed light in order to communicate information such as train length, the pulsing being implemented by a shutter 330 controlled by the processor.

It is to be understood that elements of the monitoring system may be combined in different combinations in different embodiments of the present invention. Processing elements of the system may be implemented in digital electronic circuitry, or in computer hardware, firmware, software, or in combinations thereof. Such elements can be implemented as a computer program product, tangibly embodied in an information carrier, such as a non-transient, machine-readable storage device, for execution by, or to control the operation of, data processing apparatus, such as a programmable processor or deployed to be executed on multiple computers at one site or distributed across multiple sites. Memory storage may also include multiple distributed memory units, including one or more types of storage media including, but are not limited to, magnetic media, optical media, and integrated circuits such as read-only memory devices (ROM) and random access memory (RAM). The system may have one or more network interface modules controlling sending and receiving of data packets over networks.

Method steps associated with the system and process can be rearranged and/or one or more such steps can be omitted to achieve the same, or similar, results to those described herein. It is to be understood that the embodiments described hereinabove are cited by way of example, and that the present invention is not limited to what has been particularly shown and described hereinabove. Rather, the scope of the present invention includes variations and modifications thereof which would occur to persons skilled in the art upon reading the foregoing description and which are not disclosed in the prior art.

The invention claimed is:

1. A system for providing a control signal to a first train moving on a track, the system comprising:
    a camera transceiver, comprising a light emitter configured to emit a narrow bandwidth light to a filed of view in front of the camera transceiver, an image sensor configured to receive reflections of the narrow bandwidth light from retro-reflectors in the field of view, and a lens subsystem;
    the retro-reflectors, installed on one or more of the track, a road crossing the track, a vehicle, and a second train; and
    a processor communicatively coupled to the camera transceiver and to a memory that comprises computer-readable instructions, which cause the processor to perform the steps of:
    determining a train speed and a train position of the first train;
    receiving images from the camera transceiver;
    processing the images to identify at least one of the retro-reflectors appearing as pixels in the images;
    responsively, calculating a speed and a position of a potential obstacle on the track;
    responsively to calculating the potential obstacle speed and position, determining a safe speed of the first train; and
    responsively to determining the safe speed, providing a control signal to control the first train to avoid a collision.

2. The system of claim 1, wherein the control signal controls an acceleration unit or an audio driver alert unit of the first train, or a turning, switching or other control unit of a railway system.

3. The system of claim 1, wherein determining the safe speed comprises determining a rate of deceleration or acceleration.

4. The system of claim 1, wherein the safe speed is to stop.

5. The system of claim 1, wherein the retro-reflectors are installed on the second train, wherein the second train is s the potential obstacle and is traveling towards the first train on the track, wherein processing the images comprises determining a length of the second train, and wherein determining the safe speed comprises determining that the first train must stop before reaching a junction between the first and second trains.

6. The system of claim 1, wherein the retro-reflectors are installed on the second train, wherein the second train is the potential obstacle and is traveling towards the first train on the track, wherein processing the images comprises determining a length of the second train, and wherein determining the safe speed comprises determining that the first train must take a rail switch at a junction between the first and second trains.

7. The system of claim 1, wherein the control signal further comprises a safety level, wherein the safety level is one of a set of levels comprising a first level indicating that the train speed of the first train is safe and second level indicating that the train speed of the first train is unsafe, and wherein the system is further configured to display the safety level on a display viewable by a driver or by a railway system supervisor.

8. The system of claim 7, wherein the display is a stand-alone display, a multimedia/GPS navigation display, or a smartphone/PDA display.

9. The system of claim 1, wherein the first train is a driverless train.

10. The system of claim 1, wherein the camera transceiver is installed on the first train, wherein the retro-reflectors are installed on the second train, and wherein the second train is the potential obstacle on the track.

11. The system of claim 1, wherein the retro-reflectors are installed on the second train, wherein the second train is the potential obstacle and is traveling towards the first train on the track, and wherein calculating the speed and the position of the potential obstacle comprises determining that a relative speed between the first train and second train is changing.

12. The system of claim 1, wherein receiving the images further comprises determining a contour of the track from the images and responsively orienting the camera transceiver to a view of the track.

13. The system of claim 1, wherein the light emitter and the image sensor respectively transmit laser pulses to the retro-reflectors and receive laser pulses from the retro-reflectors through one or more common lenses of the lens subsystem.

14. The system of claim 1, wherein processing the images comprises determining a length of the second train by matching a pattern of one or more of a retro-reflector configuration, a shutter rate, and a color, to a pre-defined pattern defining a length.

15. The system of claim 1, wherein the camera transceiver is a front camera transceiver and wherein the system further comprises back camera transceivers on the second train.

16. The system of claim 15, wherein processing the images further comprises identifying reflections from retro-reflectors of the back camera transceivers, on the second train, and wherein determining the safe speed comprises determining a speed to prevent the first train from hitting the back of the second train.

17. The system of claim 1, wherein the retro-reflectors are installed on the track, and wherein calculating the speed and the position of the potential obstruction comprises identifying a lack of reflected light from the retro-reflectors on the track.

18. The system of claim 1, wherein the camera transceiver is installed on a warning tower situated near the railway crossing, having retro-reflectors installed on the railway crossing, and wherein calculating the speed and the position of the potential obstruction comprises identifying from a field of view of the warning tower an obstruction of the retro-reflectors.

19. A method for generating a safety notification for a train on a railway track with respect to a vehicle moving on a road crossing the railway track, the method comprising:
configuring a camera transceiver comprising a light emitter configured to emit a narrow bandwidth light, an image sensor, light reflectors and a lens subsystem; and
providing a processor configured to be communicatively coupled to the camera transceiver and to a memory that comprises computer-readable instructions, which cause the processor to perform the steps of:
determining a vehicle speed and a vehicle position;
receiving images from the camera transceiver;
processing the images to calculate a length of the vehicle traveling on the road;
responsively to calculating the length of the vehicle, determining a safe speed of the train; and
responsively to determining the safe speed, providing a control signal to control the train.

20. A method for generating a safety notification with respect to a speed of a first train moving on a track, the method comprising:
configuring a camera transceiver comprising a light emitter configured to emit a narrow bandwidth light, an image sensor, one or more light reflectors and a lens subsystem; and
providing a processor configured to be communicatively coupled to the camera transceiver and to a memory that comprises computer-readable instructions, which cause the processor to perform the steps of:
determining a first train speed and a first train position;
receiving images from the camera transceiver;
processing the images to calculate a speed, a position, and a length of a second train traveling on the track;
responsively to calculating the second train speed, position, and length of the second train, determining a safe speed of the first train; and
providing a control signal to control the first train.

* * * * *